(12) United States Patent
Moriyama et al.

(10) Patent No.: US 9,645,318 B2
(45) Date of Patent: May 9, 2017

(54) OPTICAL CONNECTOR AND METHOD FOR MANUFACTURING OPTICAL CONNECTOR

(71) Applicant: FUJITSU COMPONENT LIMITED, Tokyo (JP)

(72) Inventors: Satoshi Moriyama, Tokyo (JP); Osamu Daikuhara, Tokyo (JP); Nobuyoshi Shimizu, Tokyo (JP); Takeshi Komiyama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 21 days.

(21) Appl. No.: 14/744,101

(22) Filed: Jun. 19, 2015

(65) Prior Publication Data

US 2015/0370017 A1 Dec. 24, 2015

(30) Foreign Application Priority Data

Jun. 24, 2014 (JP) .................................. 2014-129557

(51) Int. Cl.
*G02B 6/38* (2006.01)
*G02B 6/40* (2006.01)
*G02B 6/32* (2006.01)

(52) U.S. Cl.
CPC .......... *G02B 6/322* (2013.01); *G02B 6/3882* (2013.01); *G02B 6/3885* (2013.01); *G02B 6/3825* (2013.01); *Y10T 156/10* (2015.01)

(58) Field of Classification Search
None
See application file for complete search history.

(56) References Cited

U.S. PATENT DOCUMENTS

| 7,040,814 | B2 | 5/2006 | Morimoto et al. | |
|---|---|---|---|---|
| 9,052,475 | B2* | 6/2015 | Rosenberg | G02B 6/3885 |
| 2003/0179993 | A1* | 9/2003 | Shigenaga | G02B 6/32 385/33 |
| 2005/0185896 | A1* | 8/2005 | Kao | G02B 6/4249 385/89 |
| 2005/0225864 | A1* | 10/2005 | Kornrumpf | G02B 3/0075 359/619 |
| 2006/0140544 | A1* | 6/2006 | Morimoto | G02B 6/266 385/59 |
| 2006/0147159 | A1* | 7/2006 | Cheng | G02B 6/4201 385/83 |
| 2008/0063342 | A1* | 3/2008 | Ono | G02B 6/4231 385/88 |

(Continued)

FOREIGN PATENT DOCUMENTS

| JP | 2003107277 A | * | 4/2003 |
|---|---|---|---|
| JP | 2003-232963 | | 8/2003 |

(Continued)

*Primary Examiner* — Michelle R Connelly
(74) *Attorney, Agent, or Firm* — IPUSA, PLLC

(57) ABSTRACT

A method for manufacturing an optical connector includes mounting a lens member to which a lens is formed to another optical connector by inserting a guide pin provided on the another connector into a hole of the lens member, mounting a ferrule body to the lens member by inserting the guide pin into a hole of the ferrule body, and bonding the lens member and the ferrule body in a state where the guide pin is accommodated in the hole of the lens member and the hole of the ferrule body.

6 Claims, 31 Drawing Sheets

(56) References Cited

U.S. PATENT DOCUMENTS

| | | | | |
|---|---|---|---|---|
| 2013/0071063 A1* | 3/2013 | Aoki | ............... | G02B 6/327 385/33 |
| 2014/0321814 A1* | 10/2014 | Chen | ............... | G02B 6/32 385/79 |
| 2015/0010268 A1* | 1/2015 | Badihi | ............... | G02B 6/32 385/14 |

FOREIGN PATENT DOCUMENTS

| | | | |
|---|---|---|---|
| JP | 2004-184429 | | 7/2004 |
| JP | 2004184429 A | * | 7/2004 |
| JP | 2004-258407 | | 9/2004 |

* cited by examiner

FIG.3
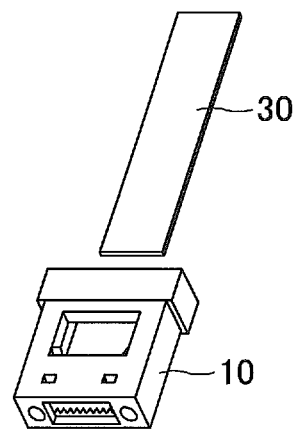
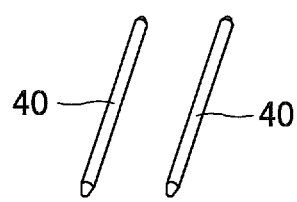
FIG.4
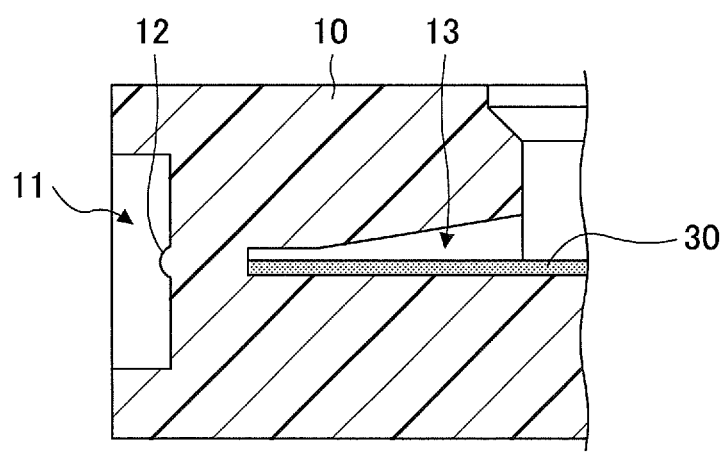

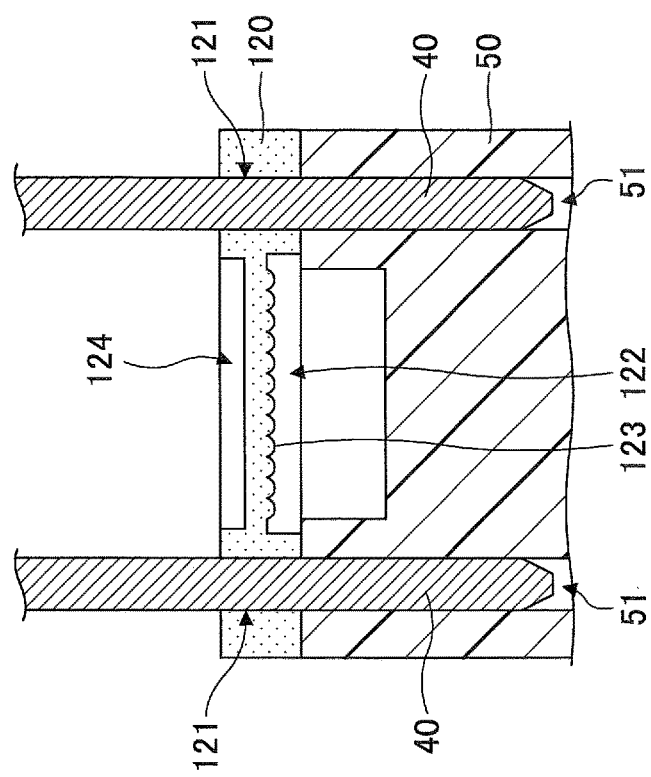
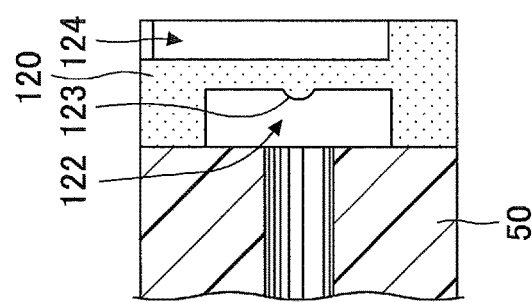
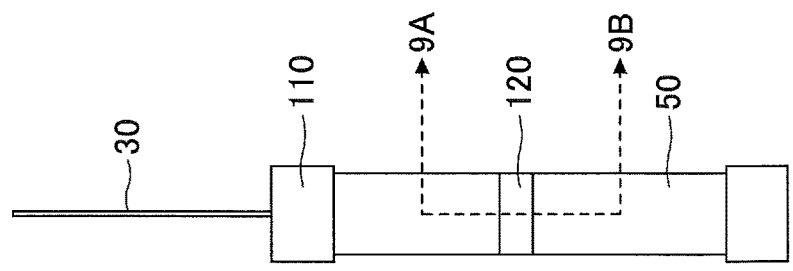

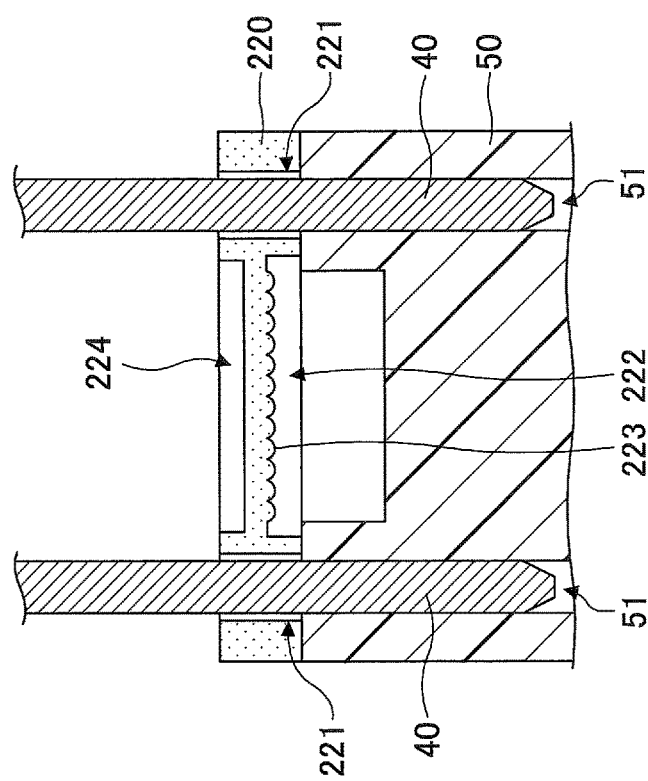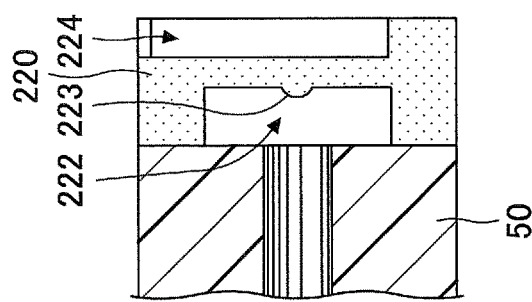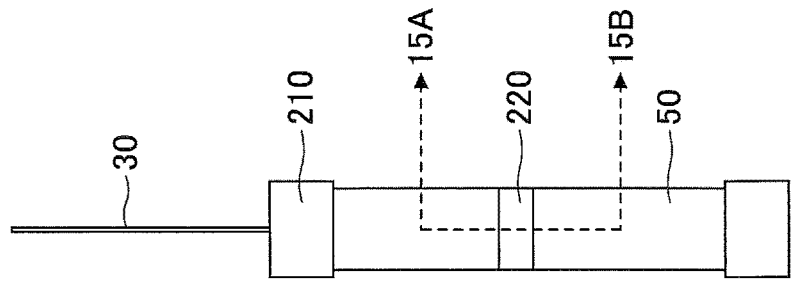

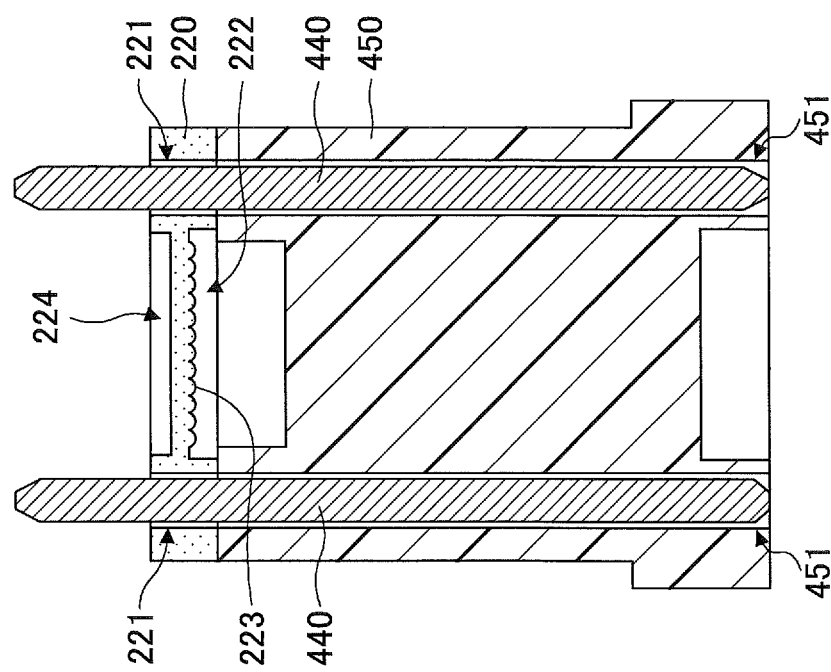
FIG.28B
FIG.28A
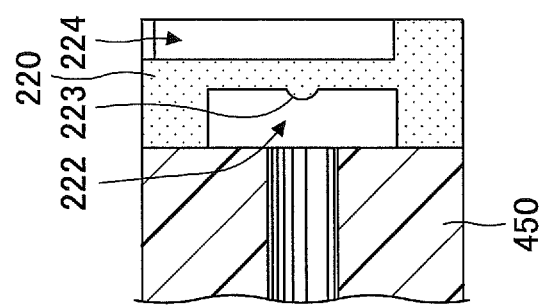
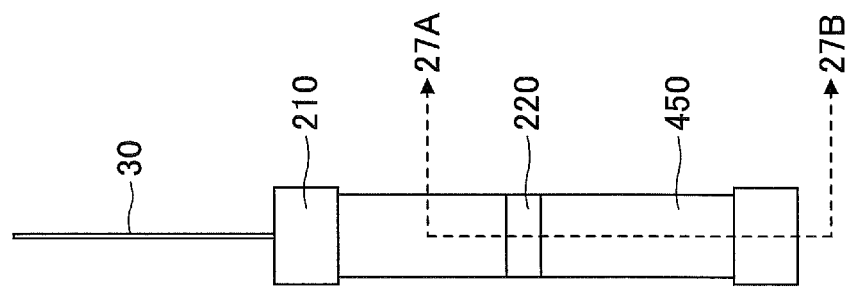
FIG.27

OPTICAL CONNECTOR AND METHOD FOR MANUFACTURING OPTICAL CONNECTOR

CROSS-REFERENCE TO RELATED APPLICATIONS

This application is based upon and claims the benefit of priority of prior Japanese Patent Application No. 2014-129557 filed on Jun. 24, 2014, the entire contents of which are hereby incorporated by reference.

BACKGROUND

1. Field of the Invention

The present invention relates to an optical connector and a method for manufacturing the optical connector.

2. Description of the Related Art

Optical communication is known as a system for achieving high speed large capacity communication. Optical fibers, film-type optical waveguides or the like are used as optical waveguides for optical communication. An optical fiber is formed of glass or a resin. The optical fiber has a clad that covers a periphery of a core formed at a center part thereof to allow light to transmit through the core. An optical waveguide such as a flexible polymer optical waveguide has multiple cores arranged in parallel inside a film formed of a resin.

Typically, an optical connector is used for connecting an optical fiber or an optical waveguide. The optical connector may be an MT (Mechanically Transferable) type connector that allows multiple cores of an optical fiber to be collectively connected, or a PMT (Polymer Mechanically Transferable) type connector to which an optical waveguide is fixed and connected. In this case, data transmission by way of optical communication can be performed between the optical fiber and the optical waveguide by connecting the MT type connector and the PMT type connector.

[Patent Document 1]: Japanese Laid-Open Patent Publication No. 2003-232963

[Patent Document 2]: Japanese Laid-Open Patent Publication No. 2004-184429

[Patent Document 3]: Japanese Laid-Open Patent Publication No. 2004-258407

For an optical connector (e.g., PMT optical connector) to which an optical waveguide is fixed and connected, optical loss may occur at a connecting part between the optical connector and the MT connector and communication characteristics may be degraded unless the optical waveguide is connected to the optical connector at a desired position. Thus, it is not preferable to connect the optical waveguide to the PMT connector in such manner.

SUMMARY

An embodiment of the present invention provides a method for manufacturing an optical connector including mounting a lens member to which a lens is formed to another optical connector by inserting a guide pin provided on the another connector into a hole of the lens member, mounting a ferrule body to the lens member by inserting the guide pin into a hole of the ferrule body, and bonding the lens member and the ferrule body in a state where the guide pin is accommodated in the hole of the lens member and the hole of the ferrule body.

Other objects and further features of the present invention will be apparent from the following detailed description when read in conjunction with the accompanying drawings.

BRIEF DESCRIPTION OF THE DRAWINGS

FIG. 3 is an exploded perspective view of an optical connector having an optical waveguide connected thereto;

FIG. 4 is a cross-sectional view of an optical connector having an optical waveguide connected thereto;

FIG. 9 is a side view of an optical connector of the first embodiment;

FIGS. 10A and 10B are schematic diagrams illustrating a process of a method for manufacturing an optical connector of the first embodiment;

FIG. 15 is a side view of an optical connector of the second embodiment;

FIGS. 16A and 16B are schematic diagrams illustrating a process of a method for manufacturing an optical connector of the second embodiment;

FIG. 27 is a side view of an optical connector of the fourth embodiment;

FIGS. 28A and 28B are schematic diagrams illustrating a process of a method for manufacturing an optical connector of the fourth embodiment;

DESCRIPTION OF EMBODIMENTS

Figure 1:
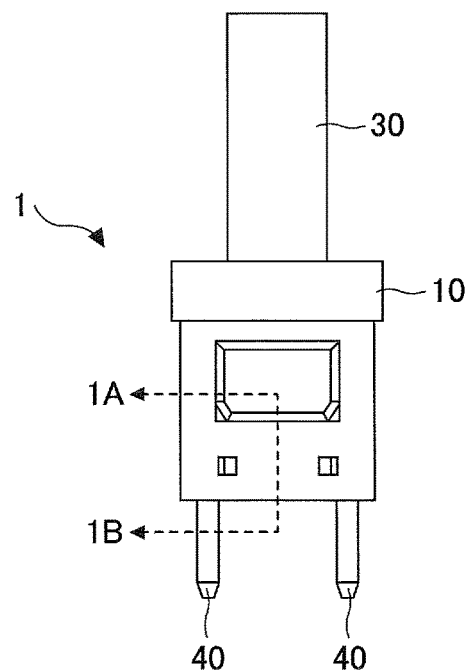
FIG. 1 is a upper view of an optical connector having an optical waveguide a connected thereto.

In the following, embodiments of the present invention are described with reference to the accompanying drawings. It is to be noted that like components are denoted with like reference numerals throughout the following description and drawings.

First Embodiment

Figure 2:
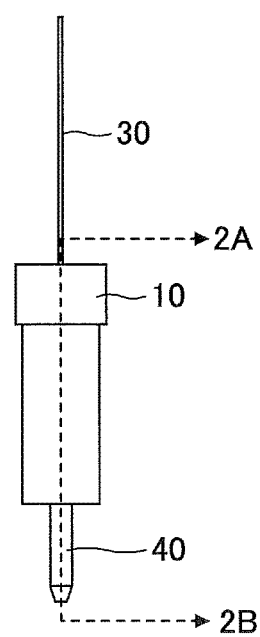
FIG. 2 is a side view of an optical connector having an optical waveguide connected thereto.
Figure 5:
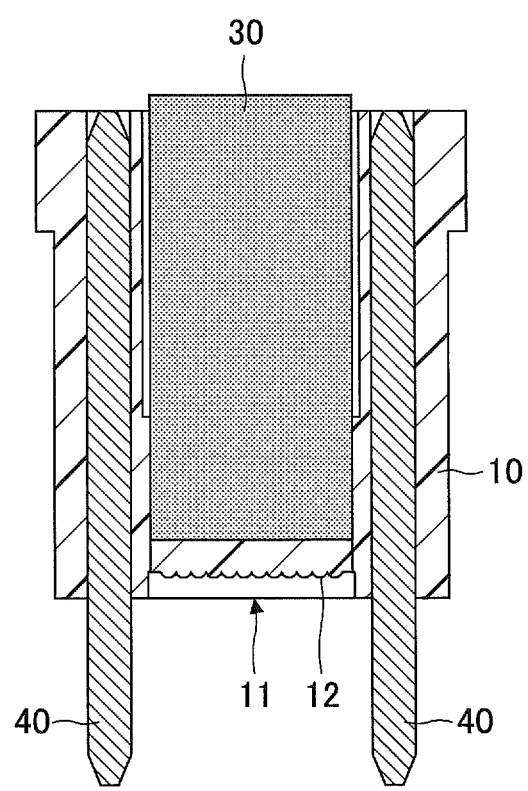
FIG. 5 is a cross-sectional view of an optical connector having an optical waveguide connected thereto.

An optical connector (e.g., PMT optical connector) having an optical waveguide or the like (hereinafter referred to as "optical waveguide") fixed and connected thereto is described with reference to FIGS. 1-5. FIG. 1 is an upper view of an optical connector 1 having an optical waveguide 30 fixed and connected thereto, FIG. 2 is a side view of the optical connector 1, and FIG. 3 is an exploded perspective view of the optical connector 1. FIG. 4 is a cross-sectional view of the optical connector 1 taken along line 1A-1B of FIG. 1, and FIG. 5 is a cross-sectional view of the optical connector 1 taken along line 2A-2B of FIG. 2.

The optical connector 1 includes a ferrule body (lens-installed ferrule body) 10 having the optical waveguide 30 fixed and connected thereto, and is connected with an MT type optical connector (not illustrated). An optical fiber having multiple cores is connected to the MT type optical connector. When connecting the MT type optical connector to the optical connector 1, the MT type optical connector and the optical connector 1 are positioned relative to each other by two guide pins 40.

A recess 11 is formed on a side of the ferrule body 10 that is to be connected to the MT type connector (lower end in FIG. 1). Multiple lenses 12 are formed at a bottom surface of the recess 11. Because the ferrule body 10 is entirely formed of a transparent resin, the lens 12 can be formed by forming a part of the bottom of the recess 11 into a projecting shape.

An opening 13 for mounting the optical waveguide 30 is formed on a side of the ferrule body 10 that is opposite to the side in which the lens 12 is formed. The optical waveguide 30 is connected to the ferrule body 10 by inserting the optical waveguide 30 into the opening 13 and fixing the optical waveguide 30 to the ferrule body 10 by using an adhesive or the like.

The opening 13 formed in the ferrule body 10 may have a height greater than the thickness of the optical waveguide 30 and a width greater than the width of the optical waveguide 30, so that the optical waveguide 30 can be accommodated therein. Thus, in a case where the opening 13 of the ferrule body 10 is formed to be larger than the thickness and the width of the optical waveguide 30, the optical waveguide 30 can freely move inside the opening 13. Therefore, the optical waveguide 30 is deviated from its intended position and fixed to the ferrule body 10 by an adhesive at an undesired position. In such a case, optical loss between the MT type connector and the ferrule body 10 may occur.

Ideally, such positional deviation of the optical waveguide 30 can be resolved if the dimension of the opening 13 of the ferrule body 10 matches the thickness and width of the optical waveguide 30. However, in reality, the opening 13 may be narrow or wide due to manufacturing error or the like during the manufacturing process of the ferrule body 10. In a case where the opening 13 of the ferrule body 10 is narrow, the optical waveguide 30 cannot be installed in a desired position of the opening 13. Thus, the optical connector 1 cannot attain a desired characteristic. In a case where the opening 13 is wide, play is created between the opening 13 and the optical waveguide 30, and may lead to the optical waveguide 30 being fixed in a position deviating from a desired position in the opening 30. Therefore, optical loss with respect to the MT type connector may occur where the opening is small or large.

Accordingly, an optical connector having an optical waveguide connected thereto is desired to prevent optical loss at a part to be connected to an MT type optical connector.

<Optical Connector>

Figure 6:
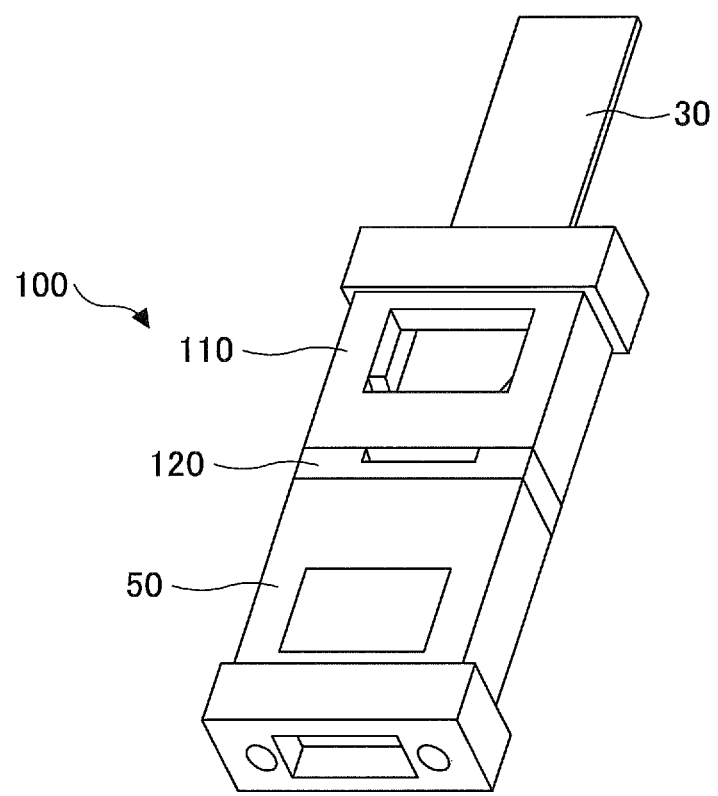
FIG. 6 is a perspective view of an optical connector according to a first embodiment of the present invention.
Figure 7:
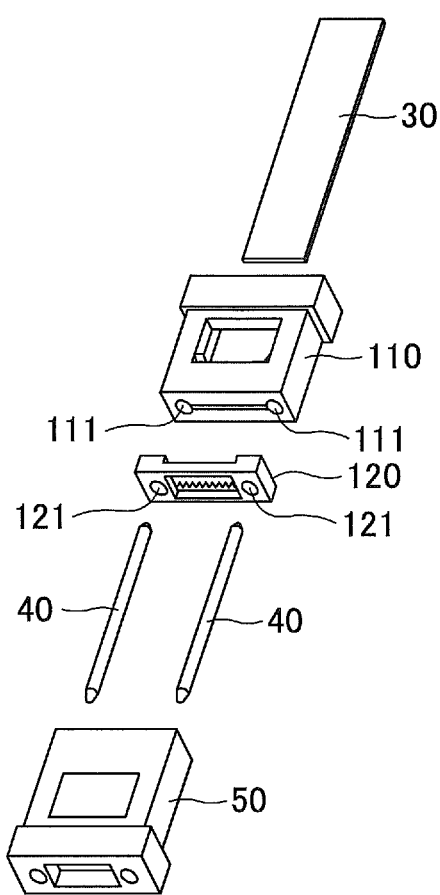
FIG. 7 is an exploded perspective view of an optical connector of the first embodiment.
Figure 8:
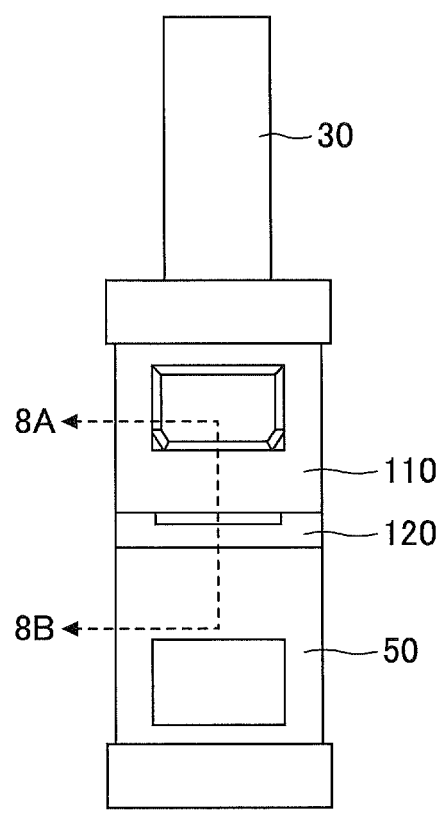
FIG. 8 is an upper view of an optical connector of the first embodiment.

Next, an optical connector according to a first embodiment of the present invention is described with reference to FIGS. 6-9. FIG. 6 is a perspective view illustrating the optical connector 100 having an MT type optical connector 50 connected thereto. FIG. 7 is an exploded perspective view of the optical connector 100. FIG. 8 is an upper view of the optical connector 100. FIG. 9 is a side view of the optical connector 100.

The optical connector includes a ferrule body 150, and a lens member 120, and is connected to an MT optical connector 50. A film-type optical waveguide 30 is connected to the optical connector 100. The optical waveguide 30 is formed of a resin such as polyimide. Multiple cores are formed in parallel in the optical waveguide 30. The ferrule body 110 is formed of a resin such as PBS (Poly Butylene Succinate). The lens member 120 is formed of a transparent resin such as COP (Cyclo Olefin Polymer) having a refractive index of 1.5. The lens member 120 includes multiple lenses that are formed as protrusions on a side of the lens member 120 facing the MT type optical connector 50. Each of the cores of the optical waveguide 30 corresponds to one of the lenses of the lens member 120.

The optical connector of this embodiment has the lens member 120 bonded to a side of the ferrule body 110 facing the MT type optical connector 50 with an adhesive. The optical waveguide 30 is connected to the ferrule body 110 on a side opposite to the side facing the MT type optical connector 50.

Two guide-pin holes 111 having shapes corresponding to two guide pins 40 are formed in the ferrule body 110. Further, two guide-pin holes 121 having shapes corresponding to the two guide pins are formed in the lens member 120.

An optical fiber (not illustrated) is connected to the MT type optical connector 50. The optical connector and the MT type optical connector 50 are connected to each other by using the two guide pins 40 to position the ferrule body 110 and the MT type optical connector 50 relative to each other. The two guide pins 40 are formed of a metal such as stainless steel.

<Method for Manufacturing Optical Connector>

Next, a method for manufacturing an optical connector 100 of the first embodiment is described with reference to FIGS. 10A-13B. FIGS. 10A, 11A, 12A, and 13A are cross-sectional views taken along line 8A-8B of FIG. 8. FIGS. 10B, 11B, 12B, and 13B are cross-sectional views taken along line 9A-9B of FIG. 9.

First, two guide pins 40 are inserted into corresponding guide-pin holes 51 provided in the MT type optical connector 50 as illustrated in FIGS. 10A and 10B. Further, the lens member 120 is mounted on the MT type optical connector 50 in a state where the guide pins 40 are accommodated in the guide-pin holes 121 of the lens member 120.

In this embodiment, the guide-pin holes 51 and the guide pins 40 are formed having substantially the same diameters. Thus, there is hardly any play between the guide-pin holes 51 and the guide pins 40. The guide-pin holes 121 and the guide pins 40 are also formed having substantially the same diameters. Thus, there is hardly any play between the guide-pin holes 121 of the lens member 120 and the guide pins 40. Therefore, when the guide pins 40 are accommodated in the guide-pin holes 121 of the lens member 120, the position of the MT type optical connector 50 and the position of the lens member 120 are matched.

The lens member 120 has a recess 122 that is formed on the side facing the MT type optical connector 50. Multiple lenses 123 are formed in the lens member 120 by forming multiple protrusions at a bottom surface of the recess 122. A groove 124 is formed on the side of the lens member 120 to be bonded to the ferrule body 110.

Figure 11A:
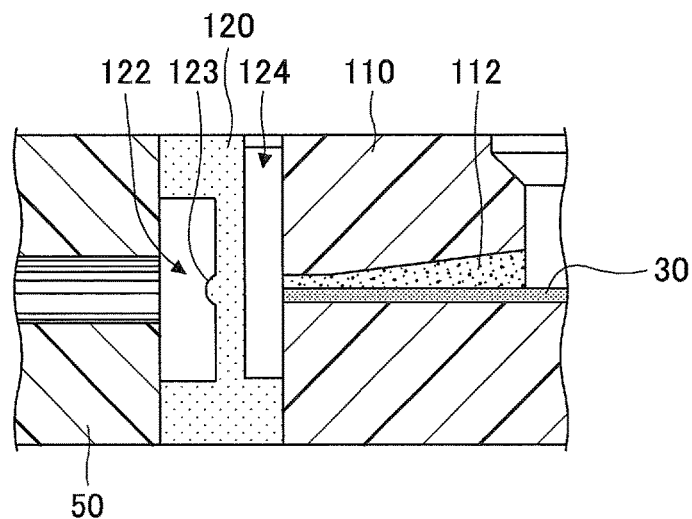
FIGS. 11A and 11B are schematic diagrams illustrating a process of a method for manufacturing an optical connector of the first embodiment.
Figure 11B:
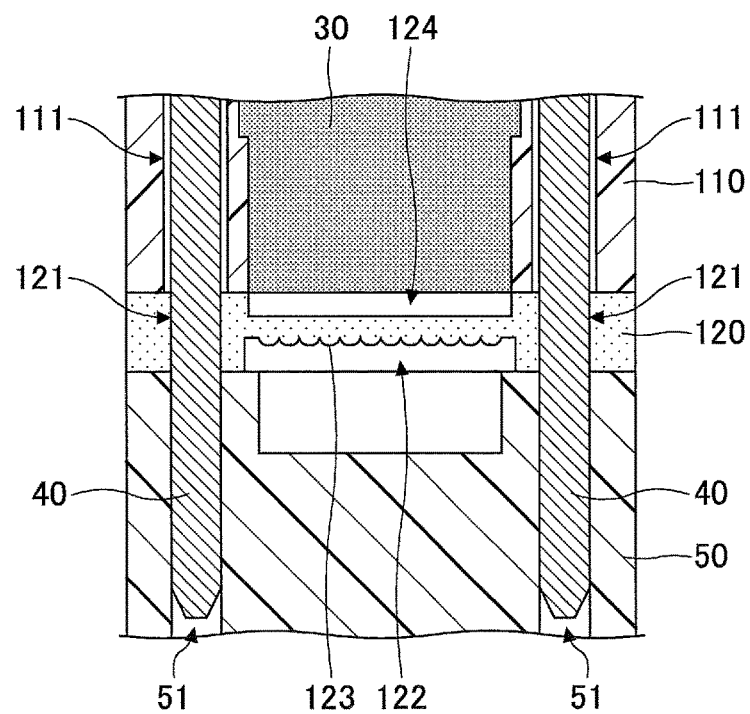

Then, the ferrule body 110 is mounted on the lens member 120 as illustrated in FIGS. 11A and 11B, in a state where the guide pins 40 are accommodated in the guide-pin holes 111 of the ferrule body 110.

The guide pin holes 111 of the ferrule body 110 are formed having diameters larger than those of the guide pins 40. Thus, there is play between the guide-pin holes 111 and the guide pins 40. That is, the ferrule body 110 can be moved relative to the lens member 120 in the state where the guide pins 40 are accommodated in the guide-pin holes 111.

The ferrule body 110 includes an opening that is formed on a side opposite from the side contacting the lens member 120. The optical waveguide 30 is placed in the opening of the ferrule body 110 and fixed to the ferrule body 110 by an adhesive 112.

Figure 12A:
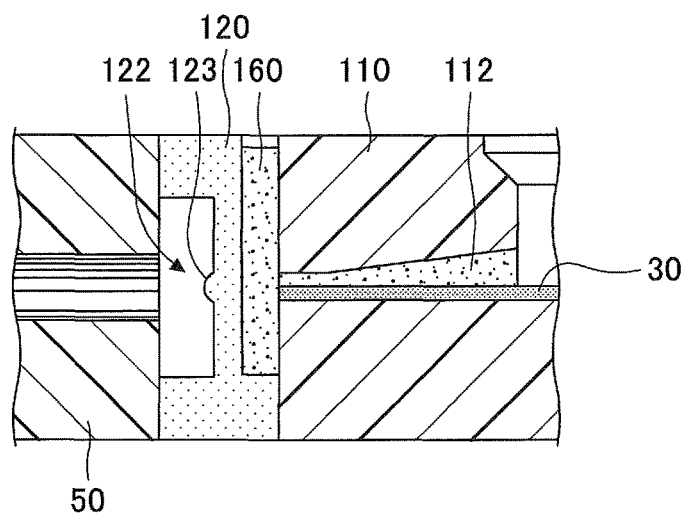
FIGS. 12A and 12B are schematic diagrams illustrating a process of a method for manufacturing an optical connector of the first embodiment.
Figure 12B:
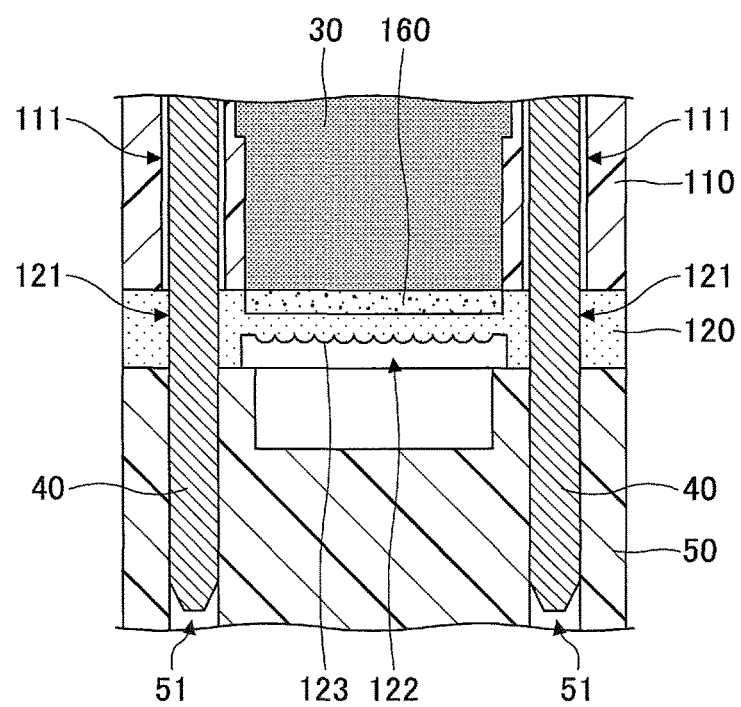
Figure 13A:
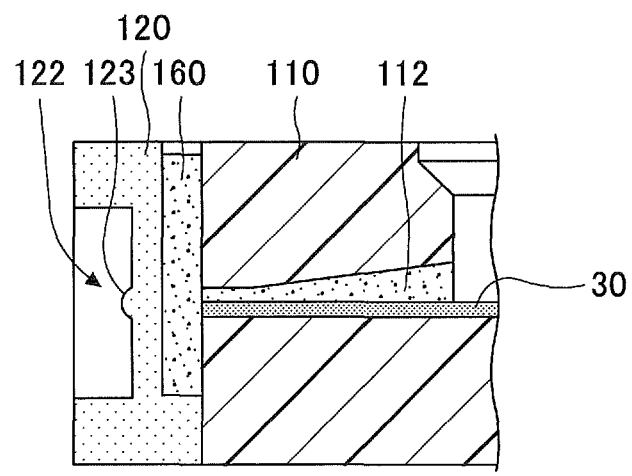
FIGS. 13A and 13B are schematic diagrams illustrating a process of a method for manufacturing an optical connector of the first embodiment.
Figure 13B:
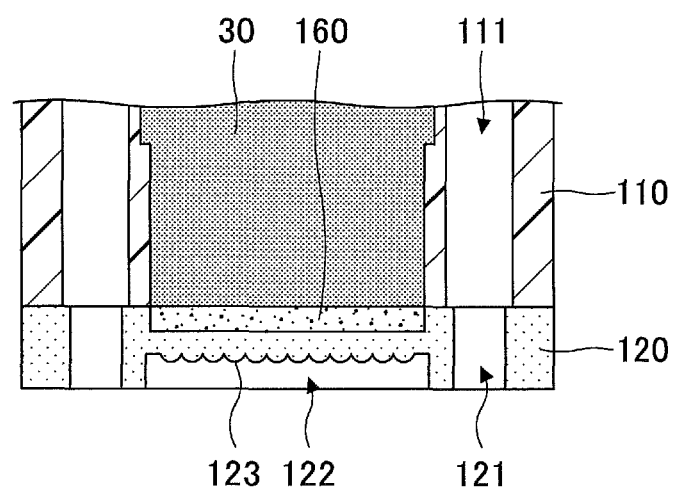

After the position of the ferrule body 110 and the lens member 120 are matched by moving the ferrule body 110 in the state where the guide pins 40 are accommodated in the guide-pin holes 111, the ferrule body 110 and the lens member 120 are adhered to each other by using an adhesive 160 as illustrated in FIGS. 12A and 12B. The ferrule body 110 may be positioned relative to the lens member 120 by moving the ferrule body 110, so that light intensity of the light that is incident from the optical waveguide 30 and detected by the optical fiber connected to the MT type optical connector 50 becomes maximum. On the other hand, the ferrule body 110 may be moved, so that light is incident from the optical fiber connected to the MT type optical connector 50, and that the light intensity detected in the optical waveguide 30 is maximized.

After positioning the ferrule body 110 relative to the lens member 120, the ferrule body 110 and the lens member 120 are fixed to each other by the adhesive 160 supplied to the groove 124 of the lens member 120. Acrylate, which is a transparent acrylate resin type UV curing adhesive having a refractive index of 1.5 (which is substantially the same as the refractive index of the material forming the lens member 120) may be used as the material of the adhesive 160. The ferrule body 110 and the lens member 120 are fixed to each other by curing the adhesive 160 by radiating UV rays to the adhesive 160. It is preferable to form the lens member 120 and the adhesive 160 with a material having substantially the same refractive index to reduce optical loss and to make optical design easier.

Then, the MT type connector 50 and the guide pins from the ferrule body 110 to which the lens member 120 is bonded. Thereby, the optical connector 100 of the first embodiment is manufactured. In this embodiment, two guide pins 40 are used to connect the optical connector and the MT type optical connector 50. The optical connector is positioned relative to the MT type optical connector 50 with the two guide pins 40 and the corresponding guide-pin holes 121 of the lens member 120 when connected with the MT type optical connector 50. Therefore, optical loss between the optical connector 100 and the MT type connector 50 is small. The optical connector 100 of this embodiment and the MT type optical connector 50 are connected in the same manner as illustrated in FIGS. 12A and 12B.

Second Embodiment

Figure 14:
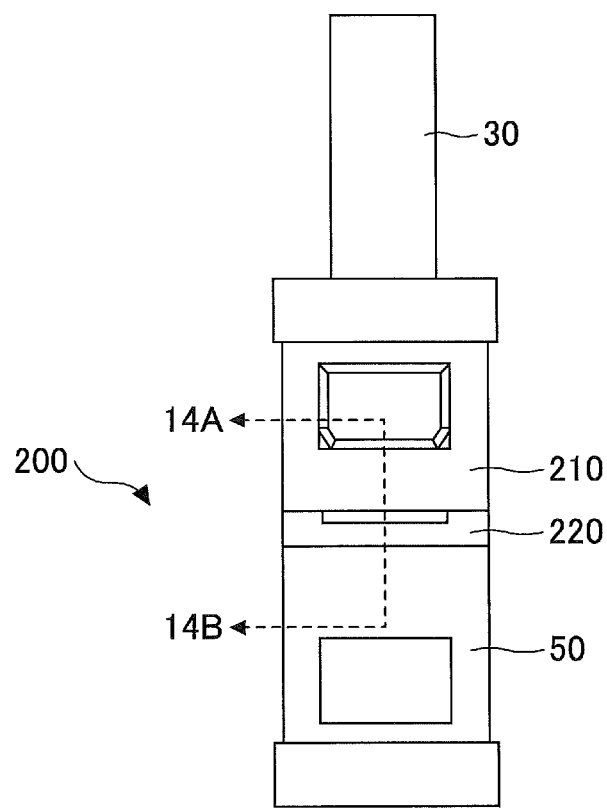
FIG. 14 is an upper view of an optical connector according to a second embodiment of the present invention.

A second embodiment of the present invention is described. As illustrated in FIGS. 14 and 15, an optical connector 200 of the second embodiment includes a ferrule body 210 and a lens member 220. FIG. 14 is an upper view of the optical connector 200 having the MT type optical connector 50 connected thereto. FIG. 15 is a side view of the optical connector 200.

A method for manufacturing the optical connector 200 of the second embodiment is described with reference to FIGS. 16A-19B. FIGS. 16A, 17A, 18A, and 19A are cross-sectional views taken along line 14A-14B of FIG. 14. FIGS. 16B, 17B, 18B, and 19B are cross-sectional views taken along line 15A-15B of FIG. 15.

First, two guide pins 40 are inserted into corresponding guide-pin holes 51 provided in the MT type optical connector 50 as illustrated in FIGS. 16A and 16B. Further, the lens member 120 is mounted on the MT type optical connector 50 in a state where the guide pins 40 are accommodated in the guide-pin holes 221 of the lens member 220.

The guide-pin holes 51 of the MT type optical connector 50 and the guide pins 40 have substantially the same diameters. Thus, there is hardly any play between the guide-pin holes 51 and the guide pins 40. The guide-pin holes 221 of the lens member 220 have greater diameters than those of the guide pins 40. Thus, there is play between the guide-pin holes 221 and the guide pins 40. That is, the lens member 220 can be moved in a state where the guide pins 40 are accommodated in the guide-pin holes 221.

The lens member 220 has a recess 222 that is formed on the side facing the MT type optical connector 50. Multiple lenses 223 are formed at a bottom surface of the recess 222 by forming multiple protrusions. A groove 224 is formed on the side of the lens member 220 to be bonded to the ferrule body 210.

Figure 17A:
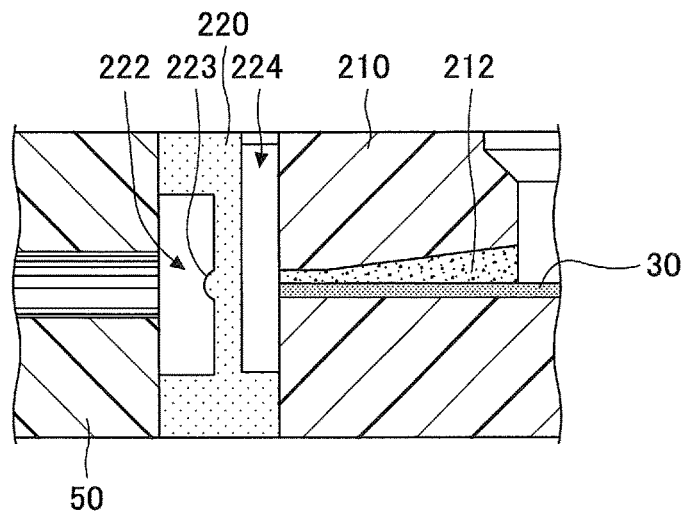
FIGS. 17A and 17B are schematic diagrams illustrating a process of a method for manufacturing an optical connector of the second embodiment.
Figure 17B:
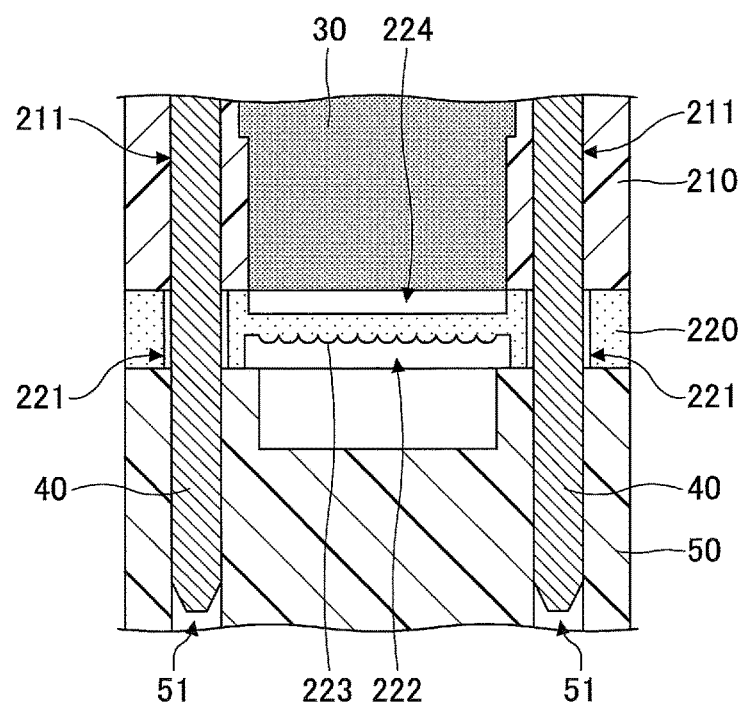

Then, the ferrule body 210 is mounted on the lens member 220 as illustrated in FIGS. 17A and 17B. The ferrule body 210 is mounted on the lens member 220 in a state where the guide pins 40 are accommodated in the guide-pin holes 211 of the ferrule body 210.

In this embodiment, the guide pin holes 211 and the guide pins 40 have substantially the same diameters. Thus, there is hardly any play between the guide-pin holes 211 and the guide pins 40. Therefore, in the state where the guide pins 40 are accommodated in the guide-pin holes 211, the position of the MT type optical connector 50 and the position of the ferrule body 210 are matched.

The optical waveguide 30 is mounted in an opening of the ferrule body 210 on a side that is opposite to the side contacting the lens member 220. The optical waveguide 30 is fixed to the ferrule body 210 by an adhesive 212.

Figure 18A:
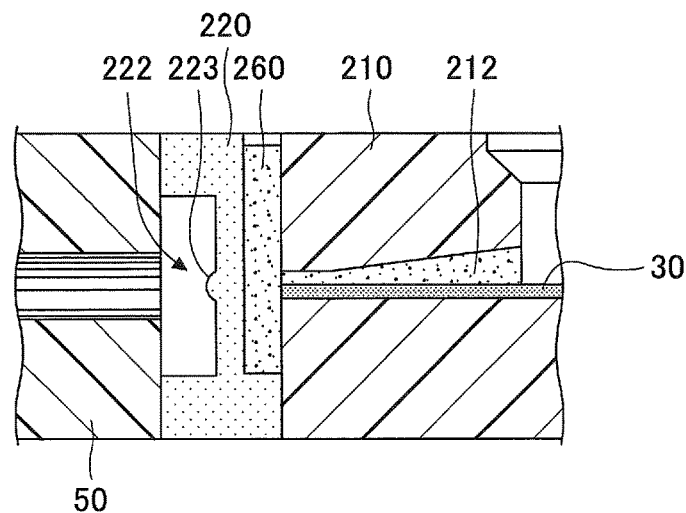
FIGS. 18A and 18B are schematic diagrams illustrating a process of a method for manufacturing an optical connector of the second embodiment.
Figure 18B:
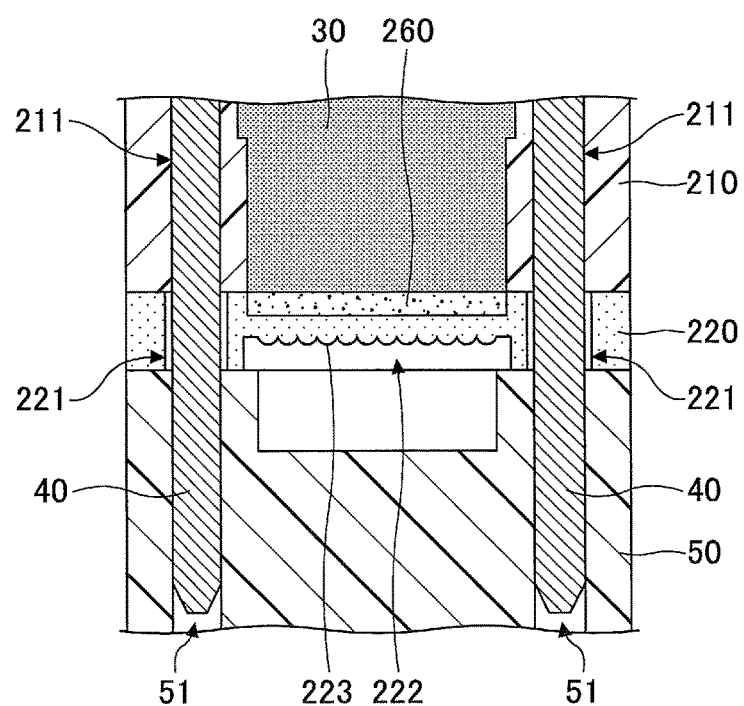

As illustrated in FIGS. 18A and 18B, the ferrule body 210 and the lens member 220 are adhered to each other by an adhesive 260 after matching the position of the MT type optical connector 50/ferrule body 210 and the position of the lens member 220 by moving the lens member 220 relative to the MT type optical connector 50 and/or the ferrule body 210 in a state where the guide pins 40 are accommodated in the guide-pin holes 221. The positioning of the MT type optical connector 50/ferrule body 210 and the lens member 220 is performed by moving the lens member 220, so that light is incident from the optical waveguide 30 and that the light intensity detected by the optical fiber connected to the MT type optical connector 50 is maximized. On the other hand, the lens member 220 may be moved, so that light is incident from the optical fiber connected to the MT type optical connector 50, and that the light intensity detected in the optical waveguide 30 is maximized.

After the positioning of the MT type optical connector 50/ferrule body 210 and the lens member 220, the ferrule body 210 and the lens member 220 are fixed to each other by the adhesive 260 supplied to the groove 224 of the lens member 220. The adhesive may be a transparent acrylic resin type UV curing adhesive having a refractive index of 1.5 which is substantially the same as the refractive index of the material forming the lens member 220 such as acrylate. By forming the lens member 220 and the adhesive 260 with a material having substantially the same refractive index, optical loss can be reduced and optical design becomes easier.

Figure 19A:
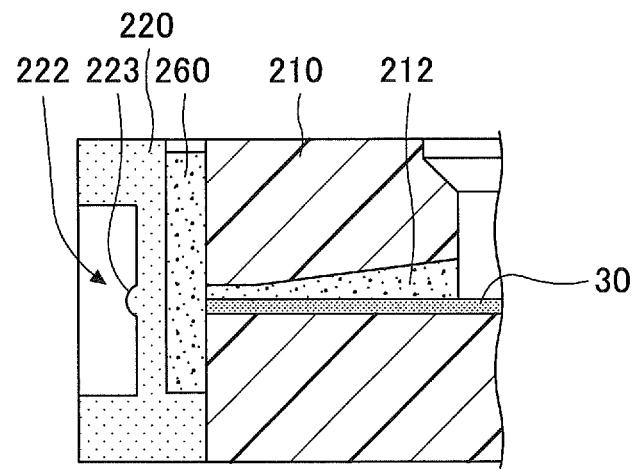
FIGS. 19A and 19B are schematic diagrams illustrating a process of a method for manufacturing an optical connector of the second embodiment.
Figure 19B:
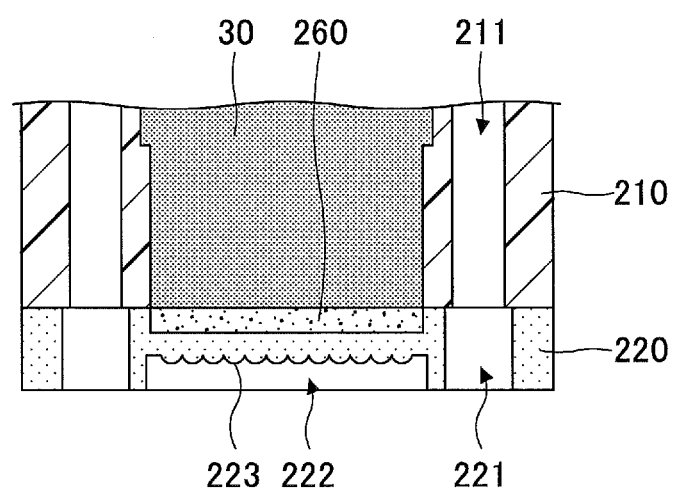

Then, as illustrated in FIGS. 19A and 19B, the MT type connector 50 and the guide pins 40 are removed from the ferrule body 210 to which the lens member 220 is bonded. Thereby, the optical connector 200 of the second embodiment is manufactured. In this embodiment, two guide pins 40 are used to connect the optical connector 200 manufactured as explained above and the MT type optical connector 50. The optical connector 200 of this embodiment is connected to the MT type optical connector 50 after being positioned by the two guide pins 40 and the corresponding guide-pin holes 211 of the ferrule body 210. Therefore, optical loss is small. The optical connector 200 and the MT type optical connector 50 are connected in the same manner as illustrated in FIGS. 18A and 18B.

Third Embodiment

Figure 20:
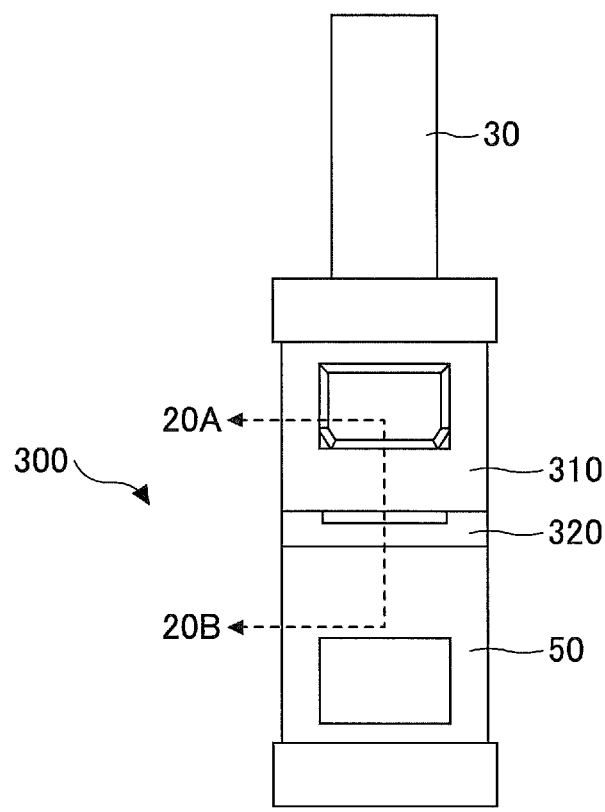
FIG. 20 is an upper view of an optical connector according to a third embodiment of the present invention.
Figure 21:
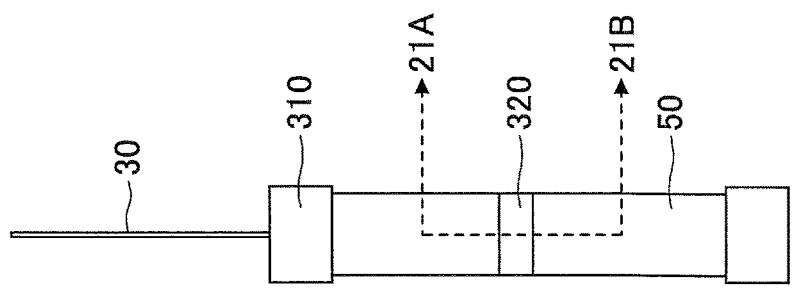
FIG. 21 is a side view of an optical connector of the third embodiment.

Next, a third embodiment of the present invention is described. As illustrated in FIGS. 20 and 21, an optical connector 300 of the third embodiment includes a ferrule body 310 and a lens member 320 having openings. FIG. 20 is an upper view of the optical connector 300 having the MT type optical connector 50 connected thereto. FIG. 21 is a side view of the optical connector 300.

A method for manufacturing the optical connector 300 of the third embodiment is described with reference to FIGS. 22A-25B. FIGS. 22A, 23A, 24A, and 25A are cross-sectional views taken along line 20A-20B of FIG. 20. FIGS. 22B, 23B, 24B, and 25B are cross-sectional views taken along line 21A-21B of FIG. 21.

Figure 22B:
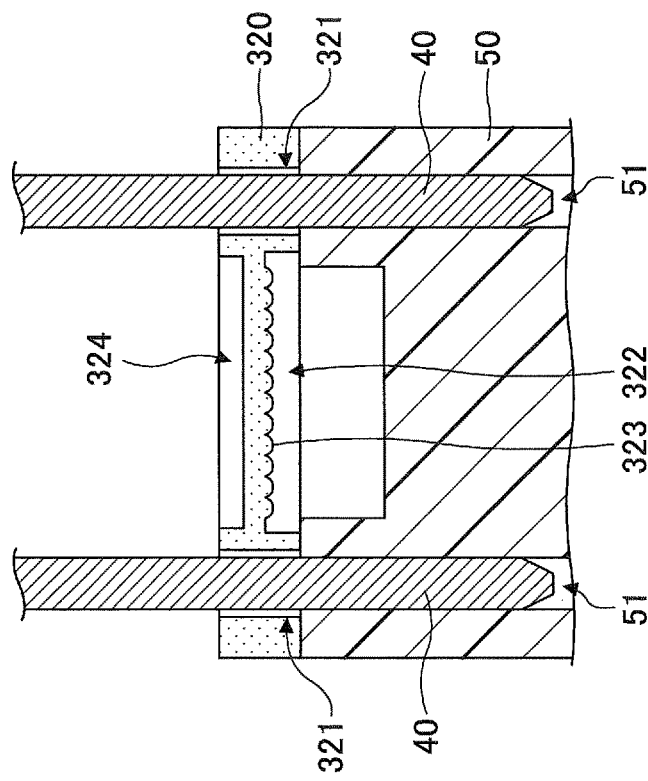
FIGS. 22A and 22B are schematic diagrams illustrating a process of a method for manufacturing an optical connector of the third embodiment.
Figure 22A:
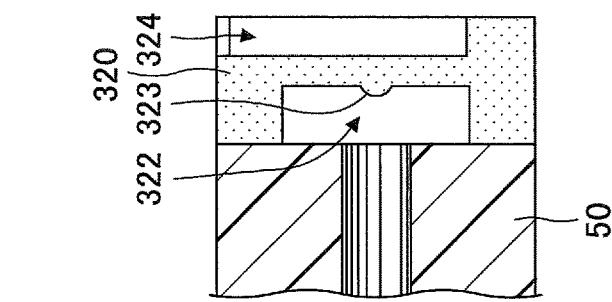

First, two guide pins 40 are inserted into corresponding guide-pin holes 51 provided in the MT type optical connector 50 as illustrated in FIGS. 22A and 2B. Further, the lens member 320 is mounted on the MT type optical connector 50. In this process, the lens member 320 is mounted on the MT type optical connector 50 in a state where the guide pins 40 are accommodated in the guide-pin holes 321 of the lens member 320.

In this embodiment, the guide-pin holes 51 and the guide pins 40 are formed having substantially the same diameters. Thus, there is hardly any play between the guide-pin holes 51 and the guide pins 40. The guide-pin holes 321 of the lens member 320 are formed having greater diameters than those of the guide pins 40. Thus, there is play between the guide-pin holes 321 and the guide pins 40. That is, the lens member 320 can be moved in a state where the guide pins 40 are accommodated in the guide-pin holes 321.

The lens member 320 has a recess 322 that is formed on the side facing the MT type optical connector 50, and multiple lenses 323 are formed by forming multiple protrusions at a bottom surface of the recess 322. The lens member 320 also has a groove 324 that is formed on the side to be bonded to the ferrule body 310.

Figure 23A:
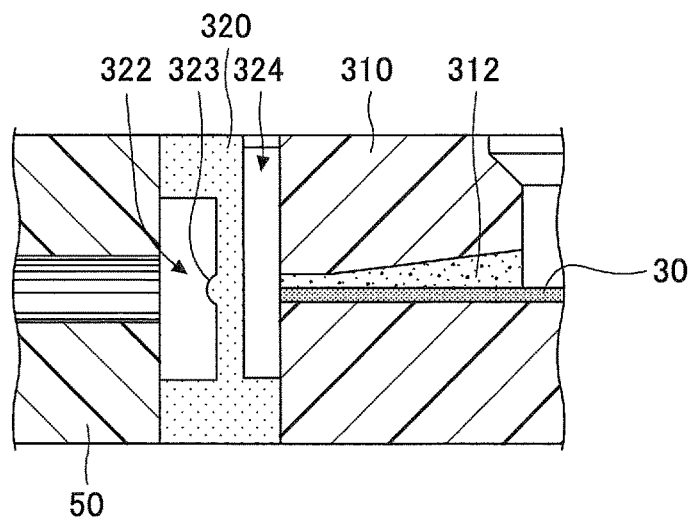
FIGS. 23A and 23B are schematic diagrams illustrating a process of a method for manufacturing an optical connector of the third embodiment.
Figure 23B:
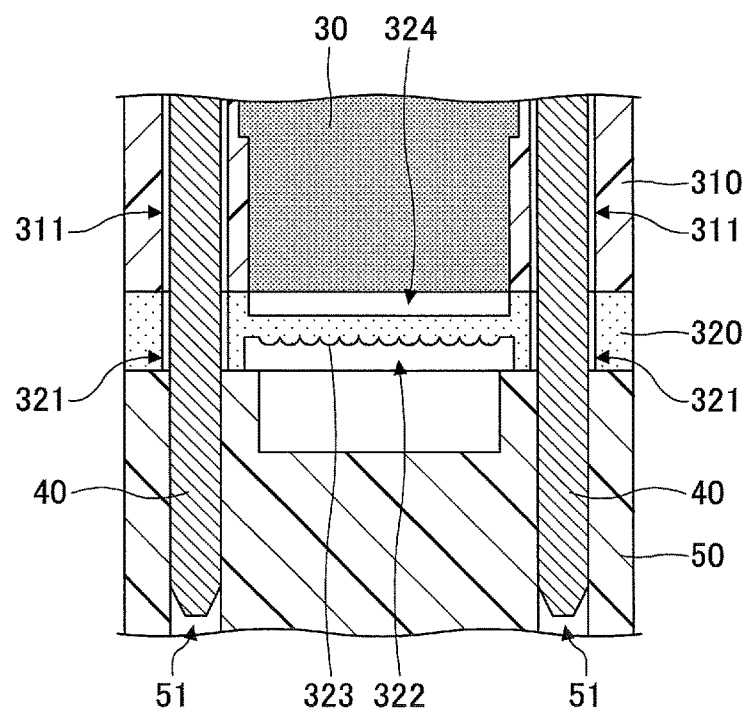

Then, the ferrule body 310 is mounted on the lens member 320 as illustrated in FIGS. 23A and 23B. The ferrule body 310 is mounted on the lens member 320 in a state where the guide pins 40 are accommodated in the guide-pin holes 311 of the ferrule body 310.

The guide pin holes 311 of the ferrule body 310 are formed having diameter greater than those of the guide pins 40. Thus, there is play between the guide-pin holes 311 and the guide pins 40. That is, the ferrule body 310 can be moved in a state where the guide pins 40 are accommodated in the guide-pin holes 311. In other words, both the lens member 320 and the ferrule body 310 can be moved relative to the MT type optical connector 50.

The optical waveguide 30 is mounted in an opening of the ferrule body 310 on a side that is opposite to the side contacting the lens member 320. The optical waveguide 30 is fixed to the ferrule body 310 by an adhesive 312.

Figure 24A:
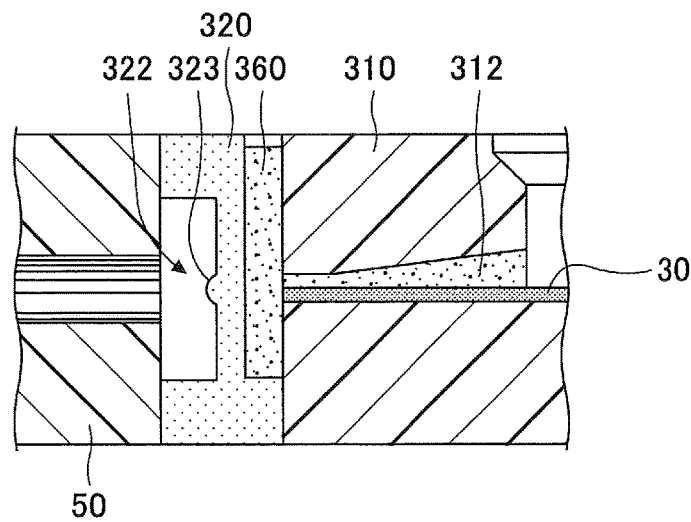
FIGS. 24A and 24B are schematic diagrams illustrating a process of a method for manufacturing an optical connector of the third embodiment.
Figure 24B:
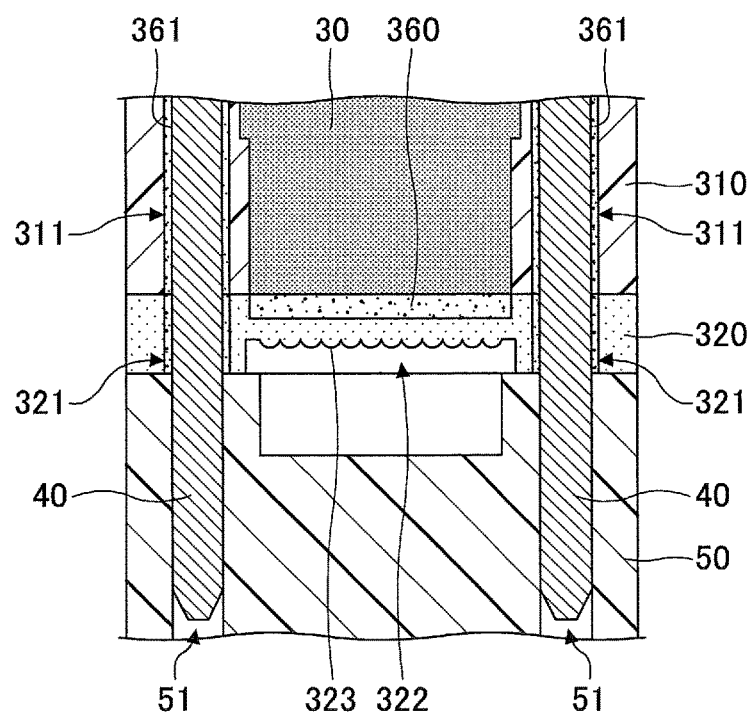

As illustrated in FIGS. 24A and 24B, the positions of the ferrule body 310 and lens member 320 are matched with the position of the MT type optical connector 50 by moving the ferrule body 310 and the lens member 320 in the state where the guide pins 40 are accommodated in the guide-pin holes 311 and the guide-pin holes 321. In the state where the positions of the ferrule body 310, the lens member 320, and the MT type optical connector 50 are matched, the ferrule body 310 and the lens member 320 are adhered to each other by an adhesive 360, and the ferrule body 310 and the lens member 320 are adhered to the guide pins 40 by an adhesive 361. The positioning of the ferrule body 310 and the lens member 320 may be performed by moving the ferrule body 310 and the lens member 320, so that light is incident from the optical waveguide 30 and that the light intensity detected by the optical fiber connected to the MT type optical connector 50 is maximized. On the other hand, the positioning of the ferrule body 310 and the lens member 320 may be performed by moving the ferrule body 310 and the lens member 320, so that light is incident from the optical fiber connected to the MT type optical connector 50, and that the light intensity detected in the optical waveguide 30 is maximized.

After positioning the MT type optical connector 50 and the ferrule body 310 and the lens member 320, the ferrule body 310 and the lens member 320 are fixed to each other by the adhesive 360 supplied to the groove 324 of the lens member 320. The adhesive 360 may be a transparent acrylic resin type UV curing adhesive agent having a refractive index of 1.5 which is substantially the same as the refractive index of the material forming the lens member 320 such as acrylate. By using a material having substantially the same refractive index to form the lens member 320 and the adhesive 360, optical loss can be reduced and optical design becomes easier.

Figure 25A:
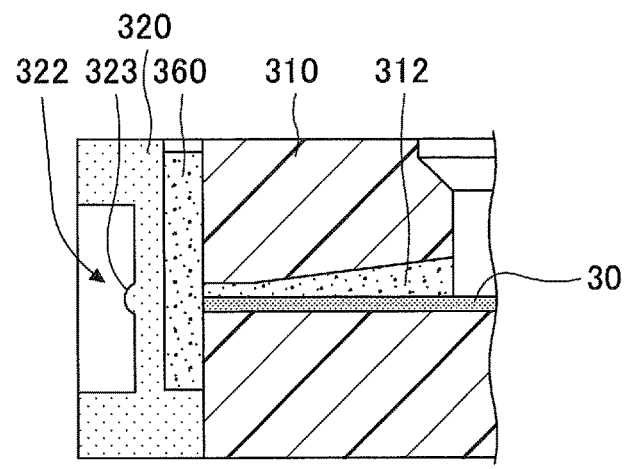
FIGS. 25A and 25B are schematic diagrams illustrating a process of a method for manufacturing an optical connector of the third embodiment.
Figure 25B:
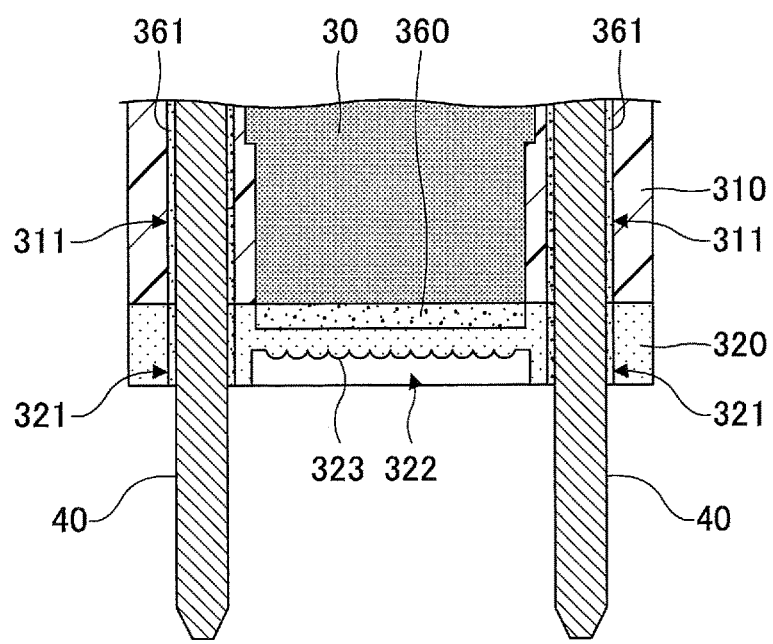

Then, as illustrated in FIGS. 25A and 25B, the MT type connector 50 is removed from the ferrule body 310 to which the lens member 320 and the guide pins 40 are adhered. Thereby, the optical connector 300 of the third embodiment is manufactured. In this embodiment, the optical connector 300 is connected to the MT type connector 50 by inserting the two guide pins 40 into the guide-pin holes 51 of the MT type connector 50. Therefore, the positions of the optical connector 300 and MT type connector are matched by the two guide pins 40 when connecting the optical connector 300 and the MT type connector 23. Accordingly, optical loss at the connecting part between the optical connector 300 and the MT type connector 50 is reduced. The optical connector 300 and the MT type optical connector 50 are connected in the same manner as illustrated in FIGS. 24A and 24B.

Fourth Embodiment

Figure 26:
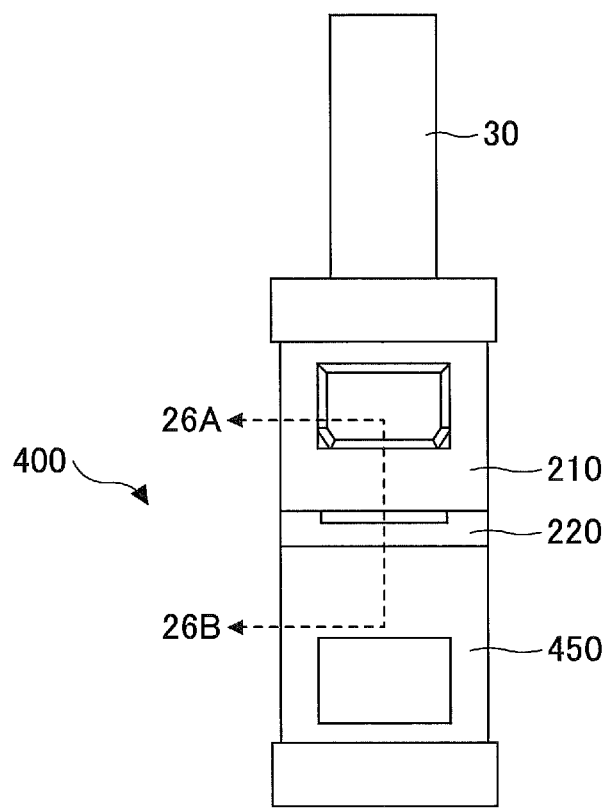
FIG. 26 is an upper view of an optical connector according to a fourth embodiment of the present invention.

A fourth embodiment of the present invention is described. As illustrated in FIGS. 26 and 27, an optical connector 400 of the fourth embodiment includes a ferrule body 210 and a lens member 220. FIG. 26 is an upper view of the optical connector 400 having an MT type optical connector 450 connected thereto. FIG. 27 is a side view of the optical connector 400.

A method for manufacturing the optical connector 400 of the fourth embodiment is described with reference to FIGS. 28A-32B. FIGS. 28A, 29A, 30A, 31A and 32A are cross-sectional views taken along line 26A-26B of FIG. 26. FIGS. 28B, 29B, 30B, 31B and 32B are cross-sectional views taken along line 27A-27B of FIG. 27.

First, two guide pins 440 are inserted into corresponding guide-pin holes 451 provided in the MT type optical connector 450 as illustrated in FIGS. 28A and 28B. Then, the lens member 220 is mounted on the MT type optical connector 450 in a state where the guide pins 40 are accommodated in the guide-pin holes 221 of the lens member 220.

The guide-pin holes 451 have diameters greater than those of the guide pins 440. Thus, there is play between the guide-pin holes 451 and the guide pins 440. That is, the MT type optical connector 450 can be moved in a state where the guide pins 440 are accommodated in the guide-pin holes 451. Further, the guide-pin holes 221 have diameters greater than those of the guide pins 440. Thus, there is play between the guide-pin holes 221 and the guide pins 440. That is, the lens member 220 can be moved in a state where the guide pins 440 are accommodated in the guide-pin holes 221 of the lens member 220.

The lens member 220 has a recess 222 formed on the side facing the MT type optical connector 450, multiple lenses 223 formed by forming multiple protrusions at a bottom surface of the recess 222, and a groove 224 formed on the side to be bonded to the ferrule body 210.

Figure 29A:
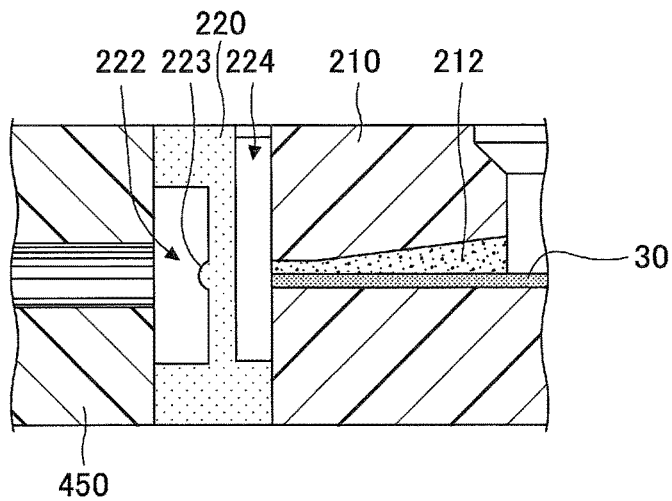
FIGS. 29A and 29B are schematic diagrams illustrating a process of a method for manufacturing an optical connector of the fourth embodiment.
Figure 29B:
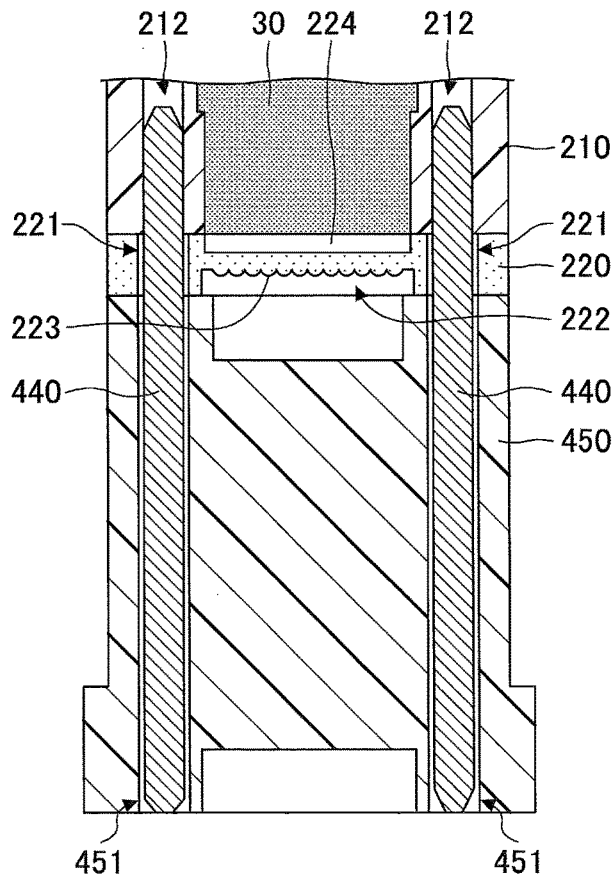

Then, the ferrule body 210 is mounted on the lens member 220 as illustrated in FIGS. 29A and 29B. The ferrule body 210 is mounted on the lens member 220 in a state where the guide pins 440 are accommodated in the guide-pin holes 211 of the ferrule body 210.

The guide pin holes 211 of the ferrule body 210 and the guide pins 440 have substantially the same diameters. Thus, there is hardly any play between the guide-pin holes 211 and the guide pins 440. Accordingly, in this embodiment, both the MT type optical connector 450 and the lens member 220 can be moved relative to the ferrule body 210.

The ferrule body 210 includes an opening that is formed on a side opposite from the side contacting the lens member 220. The optical waveguide 30 is placed in the opening of the ferrule body 210 and fixed to the ferrule body 210 by an adhesive 212.

Figure 30A:
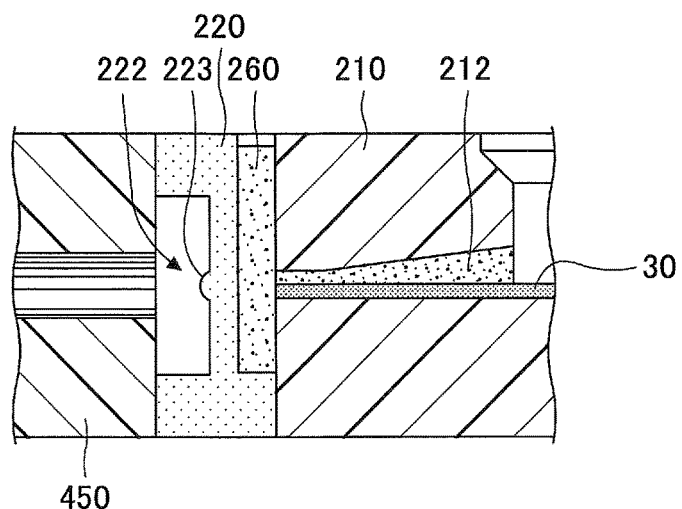
FIGS. 30A and 30B are schematic diagrams illustrating a process of a method for manufacturing an optical connector of the fourth embodiment.
Figure 30B:
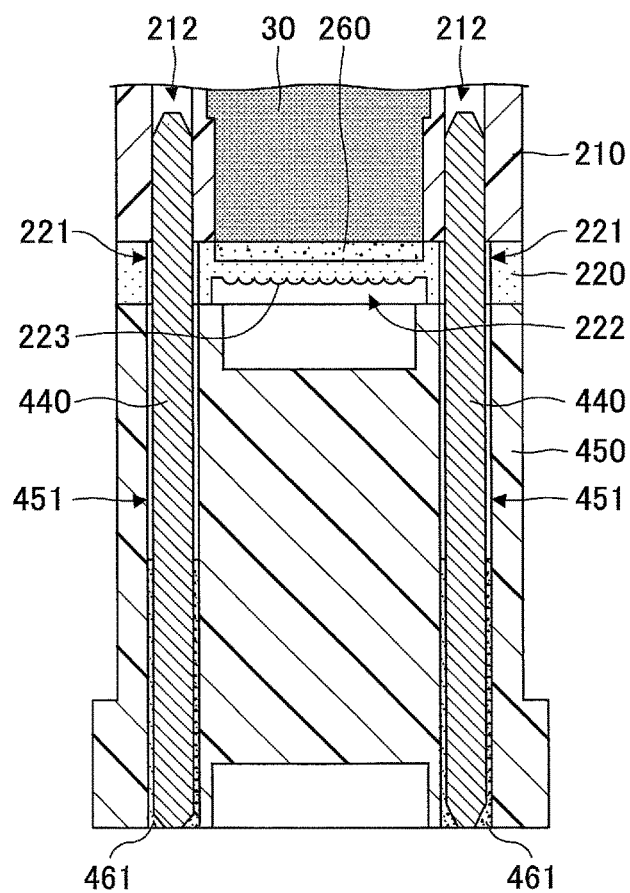

Then, as illustrated in FIGS. 30A and 30B, the positions of the MT type optical connector 450 and the lens member 220 are matched relative to the ferrule body 210 by moving the MT type optical connector 450 and the lens member 220 in the state where the guide pins 440 are accommodated in the guide-pin holes 451 and the guide-pin holes 221. When the positions of the MT type optical connector 450, the lens member 220, and the ferrule body 210 are matched, the ferrule body 210 and the lens member 220 are adhered to each other by an adhesive 260. Further, the MT type optical connector 450 and the guide pin 440 are adhered to each other by an adhesive 461.

The positioning of the MT type optical connector 450 and the lens member 220 may be performed by moving the MT type optical connector 450 and the lens member 220, so that light is incident from the optical waveguide 30 and that the light intensity detected by the optical fiber connected to the MT type optical connector 450 is maximized. On the other hand, the MT type optical connector 450 and the lens member 220 may be moved, so that light is incident from the optical fiber connected to the MT type optical connector 450, and that the light intensity detected in the optical waveguide 30 is maximized.

After positioning the MT type optical connector 450 and the lens member 220, the ferrule body 210 and the lens member 220 are fixed to each other by the adhesive 260 supplied to the groove 224 of the lens member 220. The adhesive 260 may be a transparent acrylic resin type UV curing adhesive such as acrylate having a refractive index of 1.5 which is substantially the same as the refractive index of the lens member 220. By forming the lens member 220 and the adhesive 260 with material having substantially the same refractive index, optical loss can be reduced and optical design becomes easier.

Further, the guide pins 440 accommodated in the guide-pin holes 451 is adhered and fixed to the MT type optical connector 450 by the adhesive 461 supplied to the guide-pin holes 451.

Figure 31A:
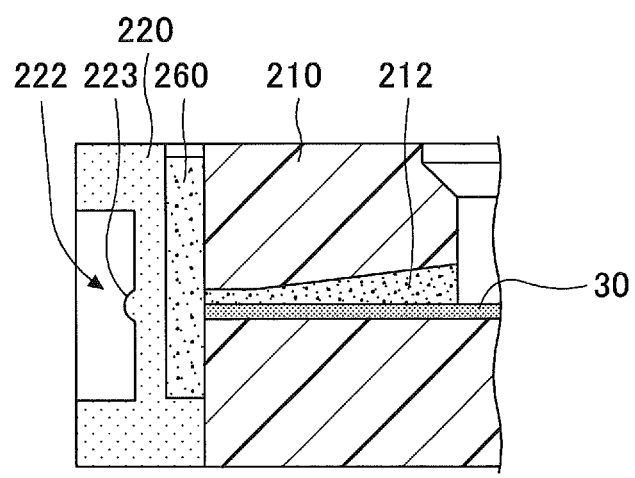
FIGS. 31A and 31B are schematic diagrams illustrating a process of a method for manufacturing an optical connector of the fourth embodiment.
Figure 31B:
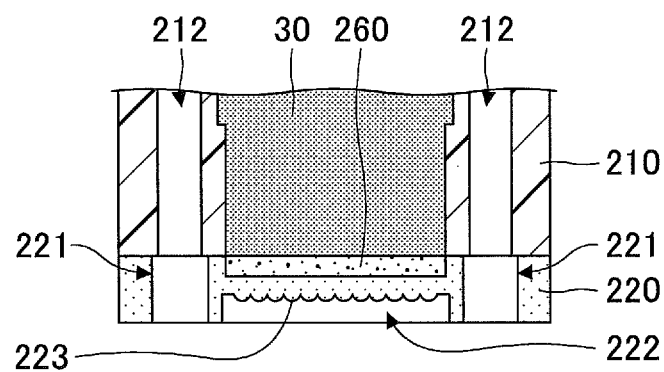
Figure 32A:
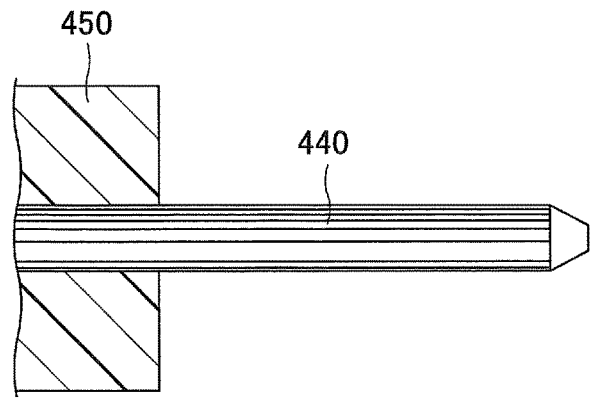
FIGS. 32A and 32B are schematic diagrams illustrating a process of a method for manufacturing an optical connector of the fourth embodiment.
Figure 32B:
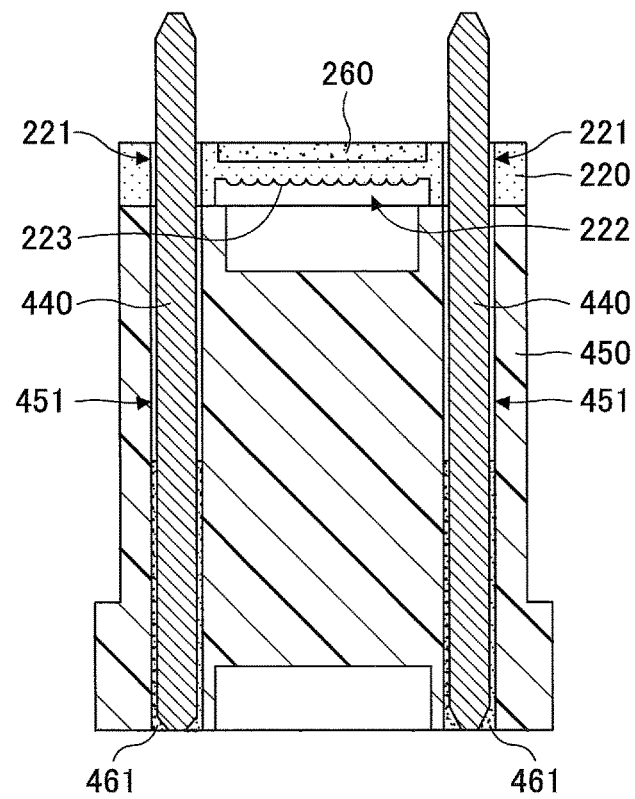

Then, as illustrated in FIGS. 31A-32B, the MT type connector 450 to which the guide pins 440 are bonded is removed from the ferrule body 210 to which the lens member 220 is bonded. The optical connector 400 having the ferrule body 210 and the lens member 220 bonded to each other is manufactured. FIGS. 31A and 31B illustrate the optical connector 400 of the fourth embodiment having the ferrule body 210 and the lens member 220 bonded by the adhesive 260. FIGS. 32A and 32B illustrate the MT type optical connector 450 and the guide pins 440 bonded by the adhesive 461.

In this embodiment, two guide pins 40 being bonded to the MT type optical connector 450 are used to connect the optical connector 400 and the MT type optical connector 450. The optical connector 400 of this embodiment is connected to the MT type optical connector 450 after being positioned by the two guide pins 440 and the corresponding guide-pin holes 211 of the ferrule body 210. Therefore, optical loss is between the optical connector 400 and the MT type connector 450 is small. The optical connector 400 and the MT type optical connector 450 are connected in the same manner as illustrated in FIGS. 30A and 30B.

Although the fourth embodiment is described with a configuration similar to that of the second embodiment, the fourth embodiment may be applied to the optical connector 100 of the first embodiment.

Fifth Embodiment

Figure 33:
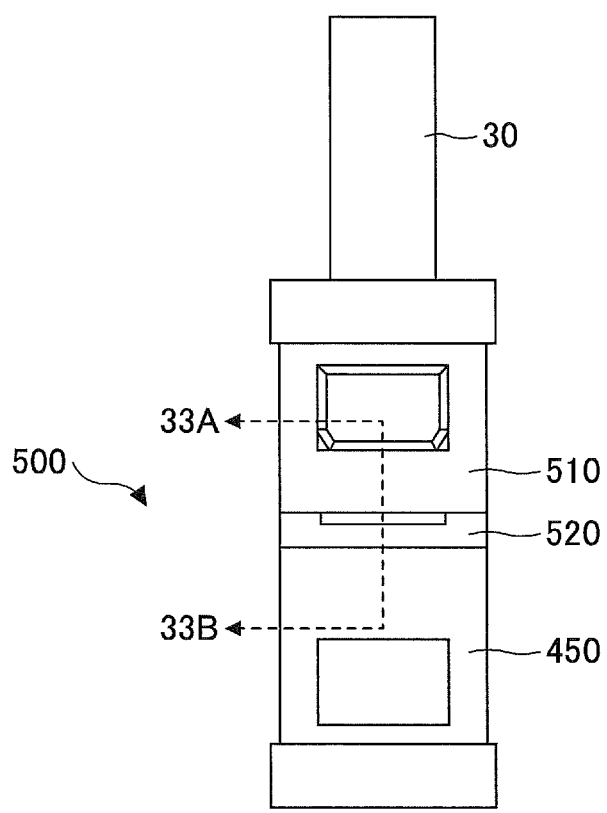
FIG. 33 is an upper view of an optical connector according to a fifth embodiment of the present invention.
Figure 34:
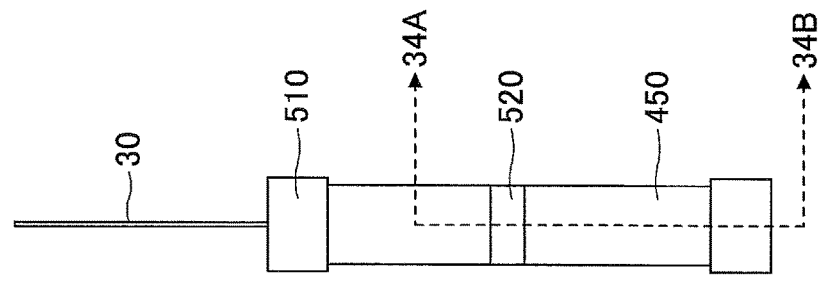
FIG. 34 is a side view of an optical connector of the fifth embodiment.

A fifth embodiment of the present invention is described. As illustrated in FIGS. 33 and 34, an optical connector 500 of the fifth embodiment is manufactured using the MT type optical connector 450 of the fourth embodiment. FIG. 33 is an upper view of the optical connector 500 having the MT type optical connector 450 connected thereto. FIG. 34 is a side view of the optical connector 500.

A method for manufacturing the optical connector 500 of the fifth embodiment is described with reference to FIGS. 35A-38B. FIGS. 35A, 36A, 37A and 38A are cross-sectional views taken along line 33A-33B of FIG. 33. FIGS. 35B, 36B, 37B and 38B are cross-sectional views taken along line 34A-34B of FIG. 34.

Figure 35B:
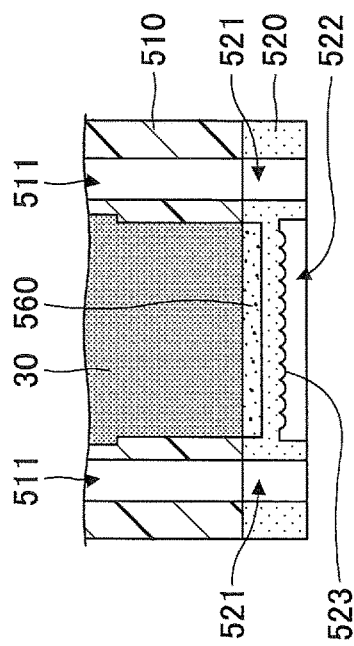
FIGS. 35A and 35B are schematic diagrams illustrating a process of a method for manufacturing an optical connector of the fifth embodiment.
Figure 35A:
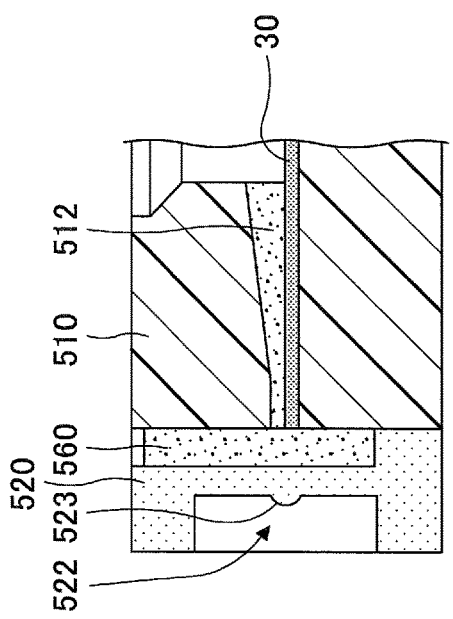

First, as illustrated in FIGS. 35A and 35B, a ferrule body 510 and a lens member 520 are adhered to each other by an adhesive 560. The ferrule body 510 and the lens member 520 are adhered in a state where the position of the guide-pin holes 511 of the ferrule body 510 and the position of the guide-pin holes 521 of the lens member 520 are matched. The adhesive 560 used during this process may be a transparent acrylic resin type UV curing adhesive such as acrylate having a refractive index of 1.5 which is substantially the same as the refractive index of the lens member 520. By using a material having substantially the same refractive index to form the lens member 520 and the adhesive 560, optical loss can be prevented and optical design becomes easier. The optical waveguide 30 is mounted in an opening of the ferrule body 510 on a side that is opposite to the side contacting the lens member 520. The optical waveguide 30 is fixed to the ferrule body 510 by an adhesive 512.

Figure 36A:
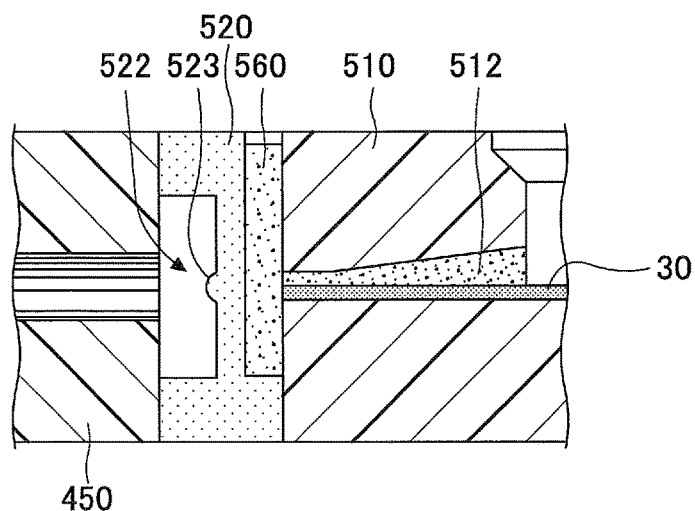
FIGS. 36A and 36B are schematic diagrams illustrating a process of a method for manufacturing an optical connector of the fifth embodiment.
Figure 36B:
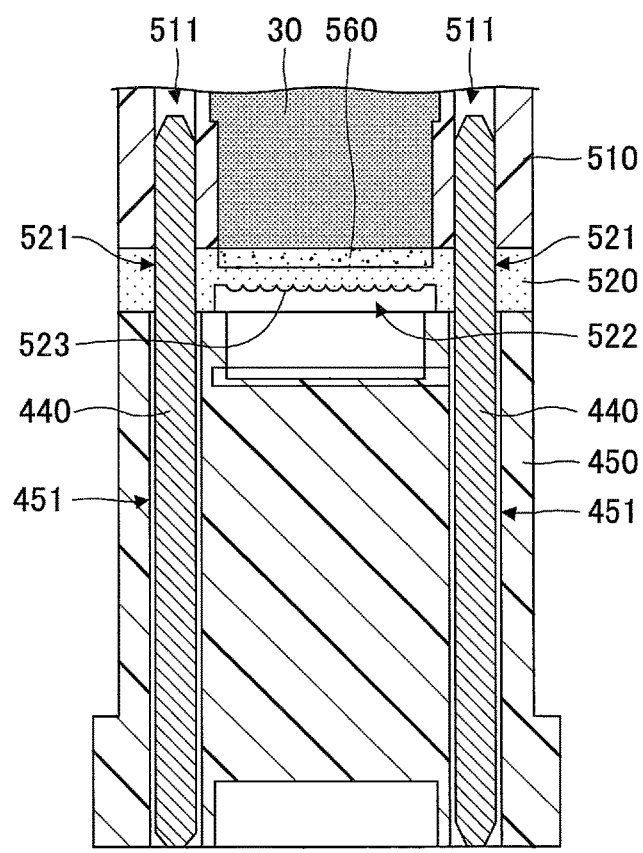

Then, as illustrated in FIGS. 36A and 36B, the guide pins 440 are inserted into corresponding guide-pin holes 451 provided in the MT type optical connector 450. Further, the ferrule body 510 and the lens member 520 are mounted on the MT type optical connector 450 in a state where the guide pins 440 are accommodated in the guide-pin holes 521 of the lens member 520 and the guide-pin holes 511 of the ferrule body 510.

The guide-pin holes 451 of the MT type optical connector 450 have diameters greater than those of the guide pins 440. Thus, there is play between the guide-pin holes 451 and the guide pins 440. That is, the MT type optical connector 450 can be moved relative to the lens member 520 in the state where the guide pins 440 are accommodated in the guide-pin holes 451.

The guide-pin holes 511 of the ferrule body 510 and the guide pins 440 have substantially the same diameters. Thus, there is hardly any play between the guide-pin holes 511 and the guide pins 440. Further, the guide-pin holes 521 of the lens member 520 and the guide pins 440 are formed having substantially the same diameters. Thus, there is hardly any play between the guide-pin holes 531 and the guide pins 440.

The lens member 520 has a recess 522 that is formed on the side facing the MT type optical connector 450. Multiple lenses 523 are formed at a bottom surface of the recess 522. The ferrule body 510 is bonded to a side of the lens member 520 opposite to the side facing the MT type optical connector 450 by the adhesive 560.

Figure 37A:
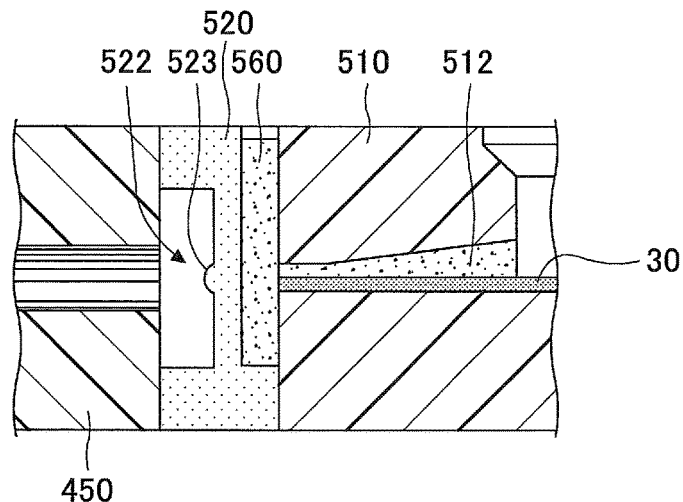
FIGS. 37A and 37B are schematic diagrams illustrating a process of a method for manufacturing an optical connector of the fifth embodiment.
Figure 37B:
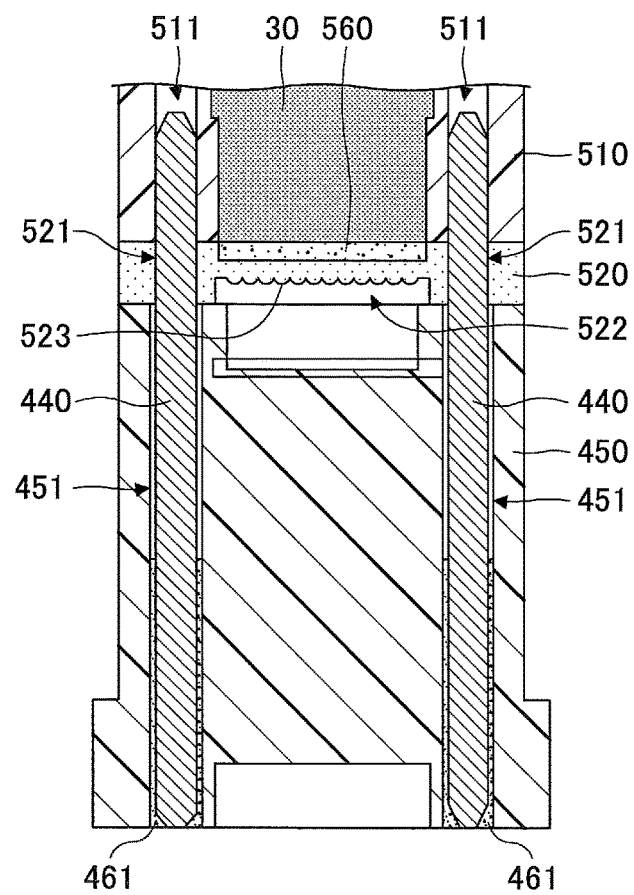

Then, as illustrated in FIGS. 37A and 37B, the positioning of the ferrule body 510, the lens member 520, and the MT type optical connector 450 is performed in the state where the guide pins 40 are accommodated in the guide-pin holes 451, the guide-pin holes 511, and the guide-pin holes 521 by moving the MT type optical connector 450 relative to the lens member 520 and the ferrule body 510. In a state where the positions of the ferrule body 510, the lens member 520, and the MT type optical connector 450 are matched, the MT type optical connector 450 and the guide pins 440 are adhered to each other by an adhesive 461.

The positioning of the MT type optical connector 450, the ferrule body 21, and the lens member 520 is performed by moving the MT type optical connector 450, so that light is incident from the optical waveguide 30 and that the light intensity detected by the optical fiber connected to the MT type optical connector 450 is maximized. On the other hand, the Mt type optical connector 450 may be moved, so that light is incident from the optical fiber connected to the MT type optical connector 450, and that the light intensity detected in the optical waveguide 30 is maximized. After positioning the MT type optical connector 450, the ferrule body 21, and the lens member 520, the guide pins 440 accommodated in the guide-pin holes 451 are adhered to the guide pin 440, and the guide-pins 440 are fixed to the MT type optical connector 450.

Figure 38A:
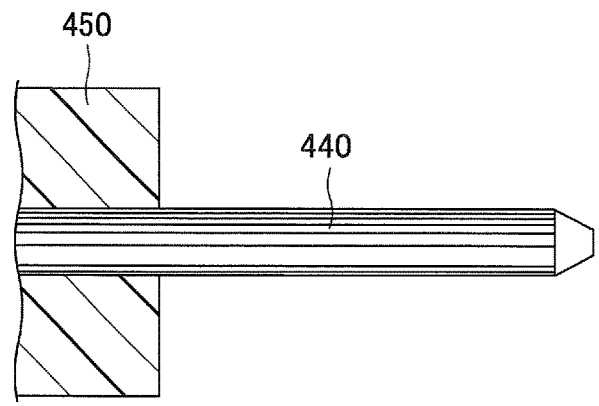
FIGS. 38A and 38B are schematic diagrams illustrating a process of a method for manufacturing an optical connector of the fifth embodiment.
Figure 38B:
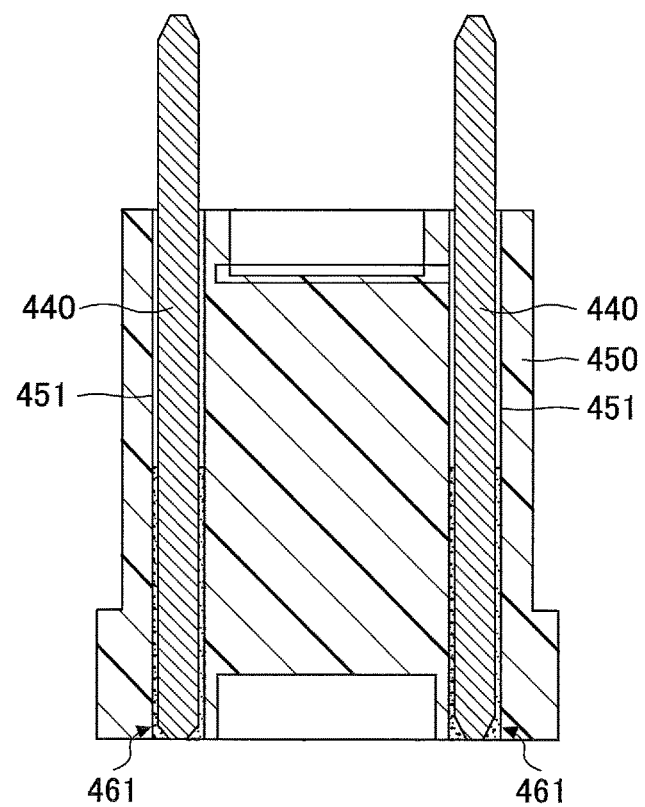

Then, as illustrated in FIGS. 38A and 38B, the ferrule body 510 to which the lens body 520 is bonded is removed from the MT type optical connector 450 to which the guide pins 440 are bonded. FIGS. 38A and 38B illustrate the MT type optical connector 450 and the guide pins 440 bonded by the adhesive 461. The optical connector having the ferrule body 510 and the lens member 520 bonded to each other is illustrated in FIGS. 35A and 35B.

Two guide pins 40 being bonded to the MT type optical connector 450 are used to connect the optical connector illustrated in FIGS. 35A and 35B and the MT type optical connector 450 illustrated in FIGS. 38A and 38B. The optical connector is connected to the MT type optical connector 450 after being relatively positioned to the MT type optical connector 450 by the two guide pins 440 and the guide-pin holes 511. Therefore, optical loss between the optical connector and the MT type connector 450 is small. The optical connector illustrated in FIGS. 35A and 35B and the MT type connector 450 are connected in the same manner as illustrated in FIGS. 37A and 37B.

In the fifth embodiment, the ferrule body 510 and the lens member 520 are bonded to each other by the adhesive 560 beforehand as illustrated in FIGS. 35A and 35B. However, similar to the fourth embodiment, the ferrule body 510 and the lens member 520 may be initially separated, and then bonded by the adhesive 560 after the guide pins 40 are inserted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for manufacturing an optical connector including a lens member and a ferrule body, and connectable to another optical connector, the method comprising:
    mounting the lens member to which a lens is formed to the another optical connector by inserting a guide pin provided in the another optical connector into a hole of the lens member;
    mounting the ferrule body to the lens member by inserting the guide pin into a hole of the ferrule body; and
    bonding the lens member and the ferrule body, by adhesive, to form the optical connector in a state where the guide pin is accommodated in the hole of the lens member and the hole of the ferrule body; and
    removing the optical connector from the another optical connector after the bonding of the lens member and the ferrule body.

2. The method as claimed in claim 1,
    wherein the hole of the lens member has a diameter greater than a diameter of the guide pin, and
    when the lens member is to be bonded to the ferrule body, the lens member is positioned relative to the ferrule body by moving the lens member in a state where the guide pin is accommodated in the hole of the lens member.

3. The method as claimed in claim 1,
    wherein the hole of the ferrule body has a diameter larger than a diameter of the guide pin, and
    when the lens member is bonded to the ferrule body, the ferrule body is moved relative to the lens member by moving the ferrule body in a state where the guide pin is accommodated in the hole of the ferrule body.

4. The method as claimed in claim 1,
    wherein the hole of the lens member and the hole of the ferrule body each has a diameter greater than a diameter of the guide pin, and
    when the lens member is bonded to the ferrule body, at least one of the lens member and the ferrule body is positioned by moving at least one of the lens member and the ferrule body in a state where the guide pin is accommodated in the hole of the lens member and the hole of the ferrule body.

5. The method as claimed in claim 1, wherein an adhesive used to bond the lens member and the ferrule body has a refractive index that is equal to a refractive index of the lens member.

6. A method for manufacturing an optical connector connectable to another optical connector, the method comprising:
    inserting a guide pin provided in the another optical connector into a hole of the optical connector, the hole having a diameter greater than a diameter of the guide pin,
    positioning the optical connector by moving the optical connector relative to the another optical connector in a state where the guide pin is accommodated in the hole of the optical connector,
    bonding the optical connector and the guide pin, by adhesive, and
    removing the optical connector from the another optical connector after the bonding of the optical connector and the guide pin.

* * * * *